(12) United States Patent
Russo

(10) Patent No.: US 6,444,941 B1
(45) Date of Patent: Sep. 3, 2002

(54) TOOL HOLDING SYSTEM

(76) Inventor: Anthony A. Russo, 7513 W. Fullerton, Elmwood Park, IL (US) 60707

( * ) Notice: Subject to any disclaimer, the term of this patent is extended or adjusted under 35 U.S.C. 154(b) by 0 days.

(21) Appl. No.: 09/589,850

(22) Filed: Jun. 8, 2000

Related U.S. Application Data

(63) Continuation of application No. PCT/US98/26061, filed on Dec. 9, 1998.
(60) Provisional application No. 60/069,121, filed on Dec. 9, 1997, provisional application No. 60/083,744, filed on May 1, 1998, and provisional application No. 60/107,542, filed on Nov. 9, 1998.

(51) Int. Cl.[7] .................................................. B23H 7/26
(52) U.S. Cl. ........................ 219/69.15; 279/83; 403/362
(58) Field of Search ........................... 219/69.15; 279/83, 279/85, 86, 87; 403/362; 204/297.01; 408/233; 409/231, 232, 234

(56) References Cited

U.S. PATENT DOCUMENTS

| | | | |
|---|---|---|---|
| 3,474,215 A | 10/1969 | Johanson | 219/69.15 |
| 3,741,573 A | 6/1973 | Treer | 219/69.15 |
| 4,151,984 A | 5/1979 | Zapart | |
| 4,153,239 A | 5/1979 | La Rocco | |
| 4,449,027 A | 5/1984 | Fujikawa | 219/69.15 |
| 4,583,432 A | 4/1986 | Bricker | 82/1 C |
| 4,596,066 A | 6/1986 | Inoue | 219/69.15 |
| 4,655,654 A | 4/1987 | Portas | 269/287 |
| 4,655,655 A | 4/1987 | Schürfeld | |
| 4,717,803 A | 1/1988 | Alexandersson | 219/69.15 |
| 4,855,558 A | 8/1989 | Ramsbro | |
| 4,859,824 A | 8/1989 | Ukaji et al. | 219/69.15 |
| 4,922,074 A | 5/1990 | Sebzda, Sr. | 219/69.15 |
| 4,964,762 A | 10/1990 | Arai et al. | 407/34 |
| 5,219,376 A | * 6/1993 | Vinohradsky | 219/69.15 |

FOREIGN PATENT DOCUMENTS

| | | | | |
|---|---|---|---|---|
| JP | 61-76218 | | 9/1984 | |
| JP | 61-86129 | * | 5/1986 | 219/69.15 |
| JP | 8-118156 | * | 5/1996 | |

* cited by examiner

*Primary Examiner*—Geoffrey S. Evans
(74) *Attorney, Agent, or Firm*—Fitch, Even, Tabin, & Flannery

(57) ABSTRACT

An electrical discharge machining system including a fixture for the post which allows the post to be mounted and clamped thereto in a precise predetermined position thereon whether the post has a round cross-sectional configuration or a polygonal shape thereto. In a preferred form, the fixture includes a bore for a round shaped post having an indexing pin which seats in a groove formed in an upper surface of the fixture and is clamped therein by clamp members actuated by cam clamp operators. The clamping of the pin in the groove keeps the post rigid and stationary relative to the fixture to provide for improved results when the electrode is subject to machining operations. In addition, because the clamping mechanism herein does away with the previously-described hydraulic clamping device utilized with prior fixtures, there are no hydraulic lines or connections that have to be set up and maintained to provide an easier-to-use fixture for use with the tool holding system.

32 Claims, 12 Drawing Sheets

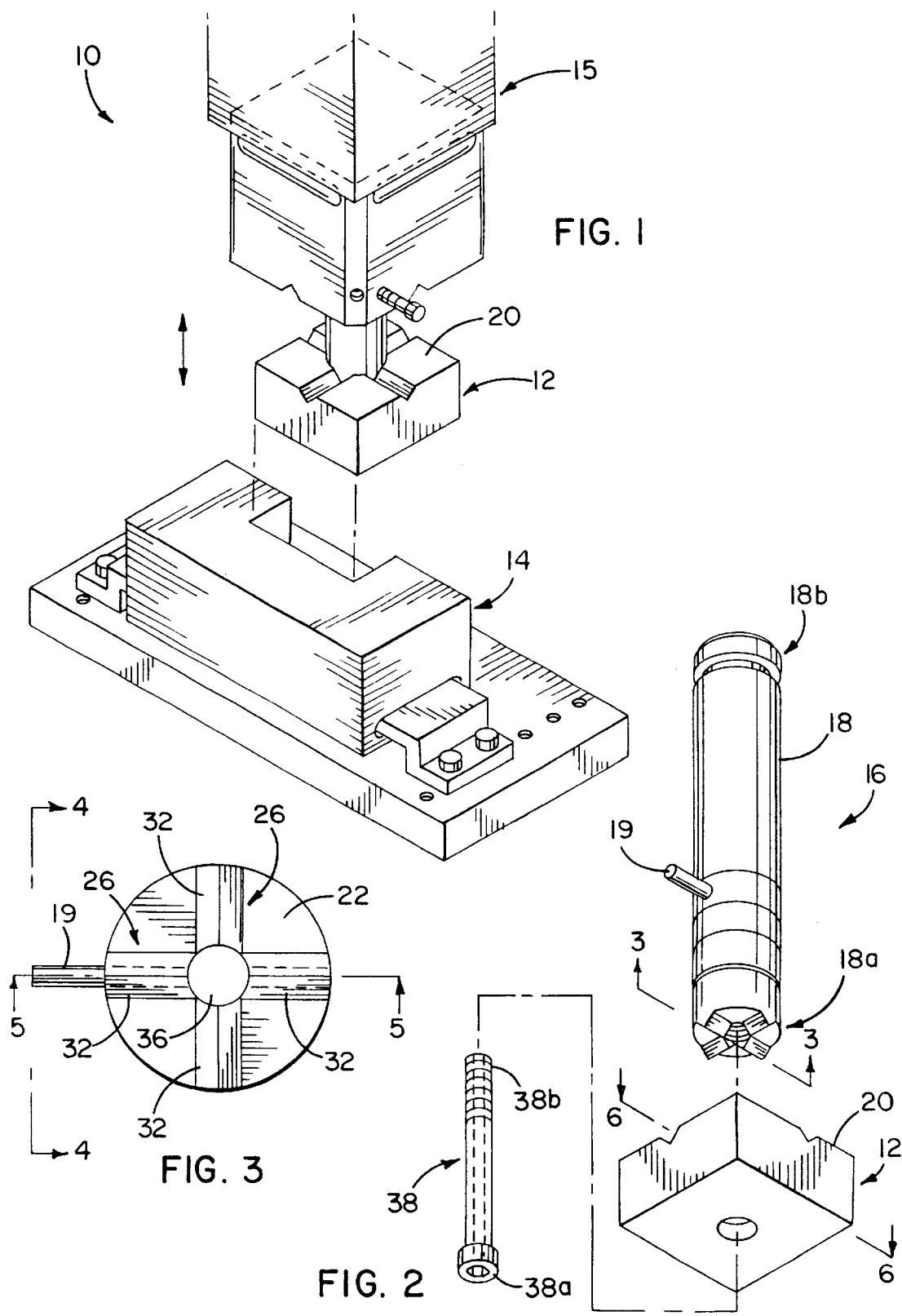

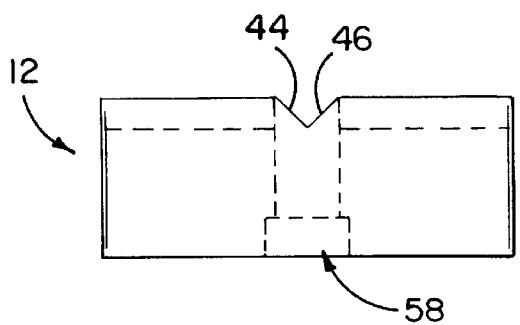
FIG. 7
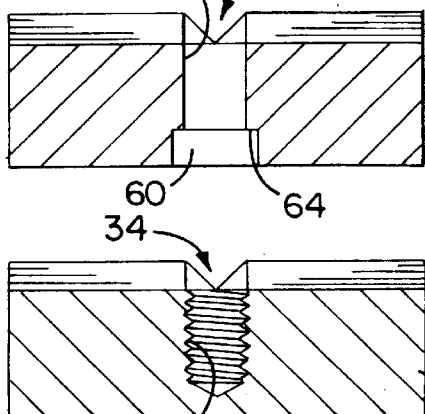
FIG. 8
FIG. 9
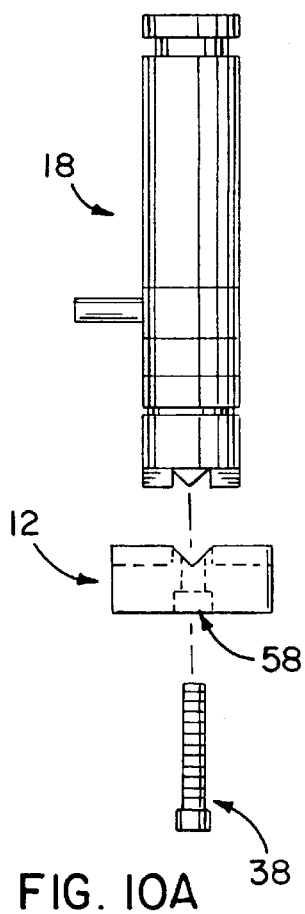
FIG. 10A
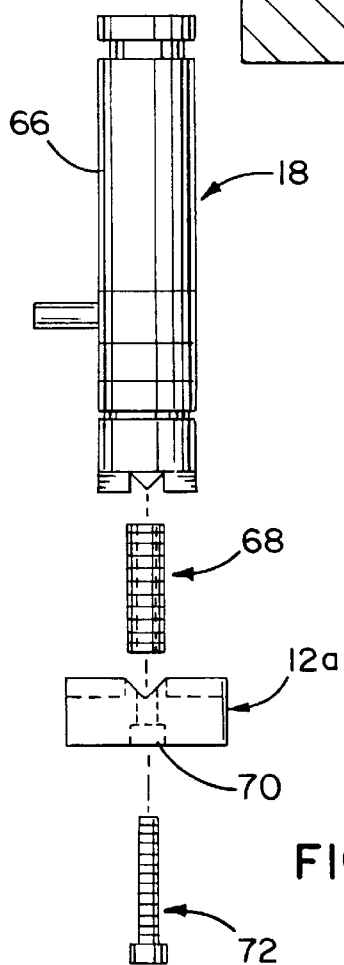
FIG. 10B

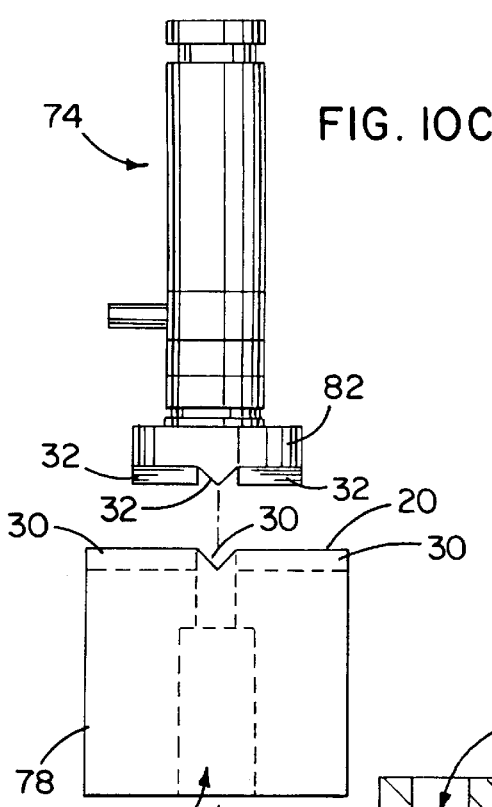
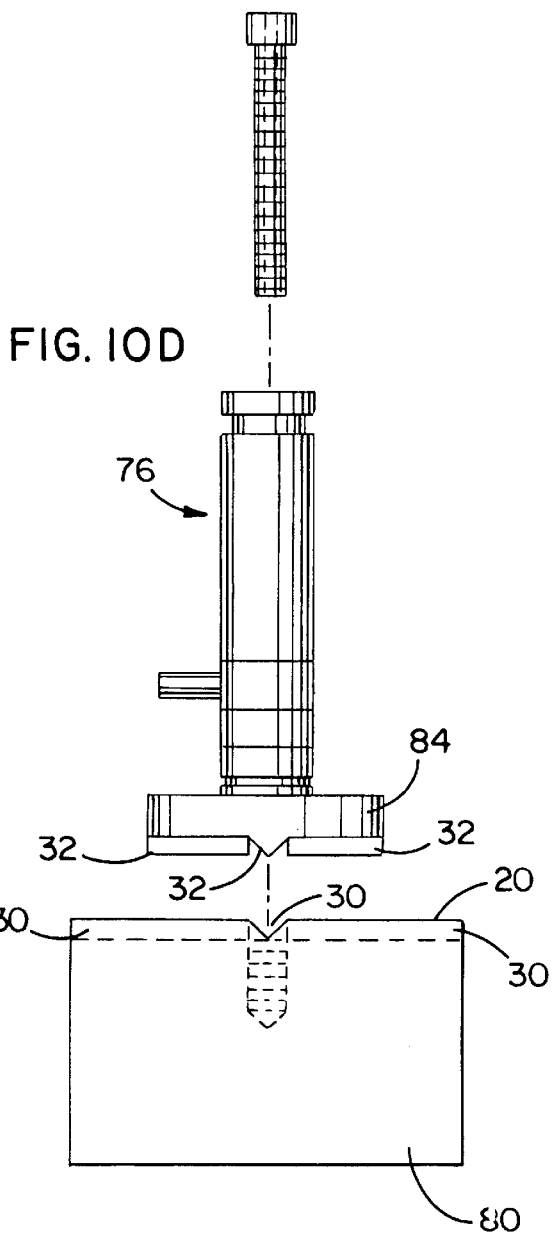
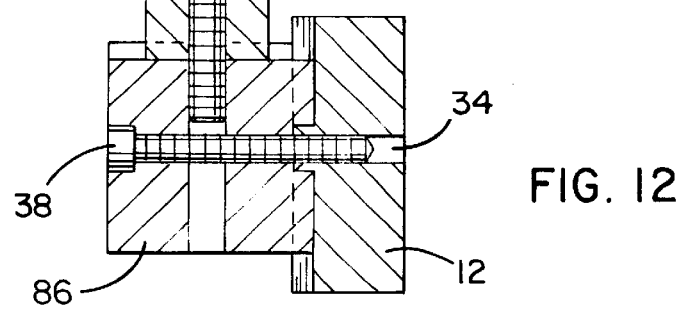

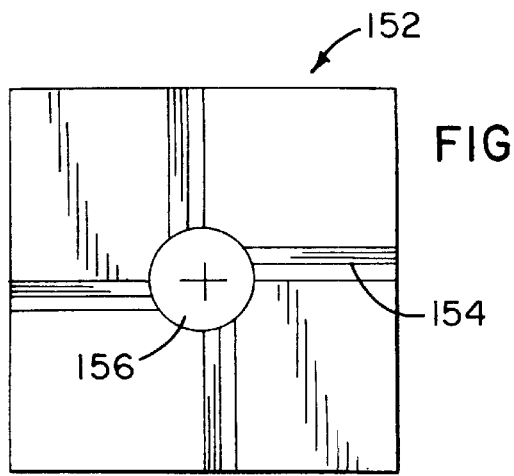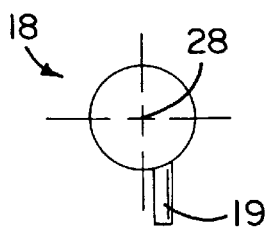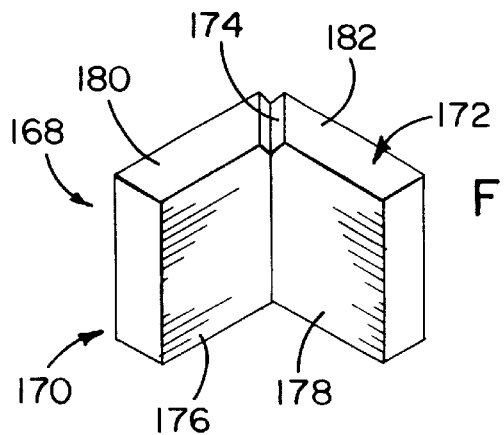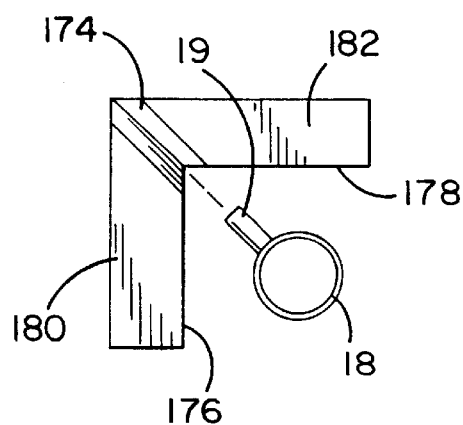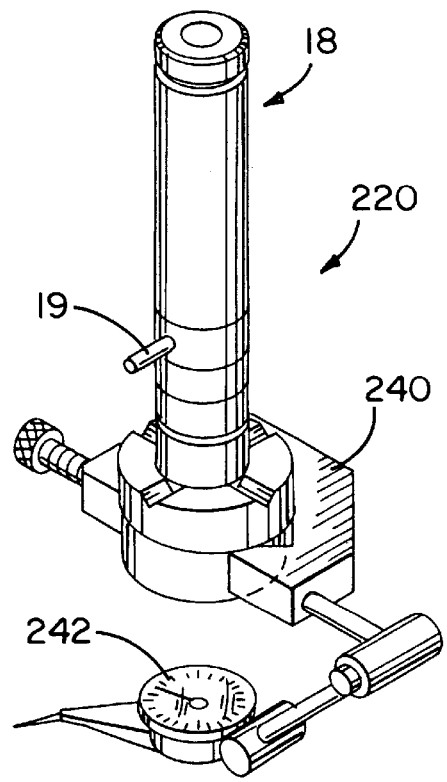
FIG. 24A
FIG. 24B
FIG. 25A
FIG. 25B
FIG. 26

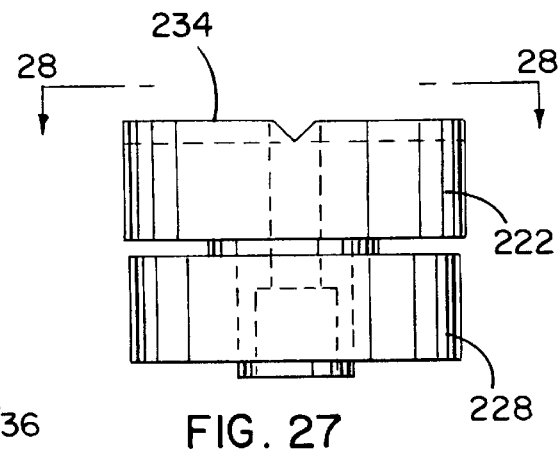
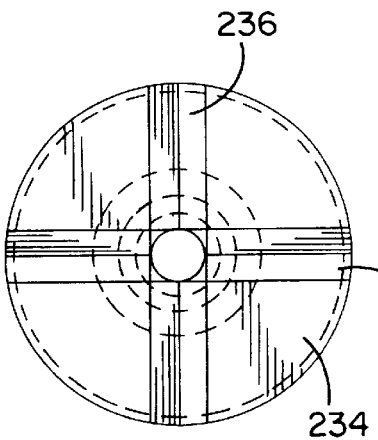
FIG. 28
FIG. 27
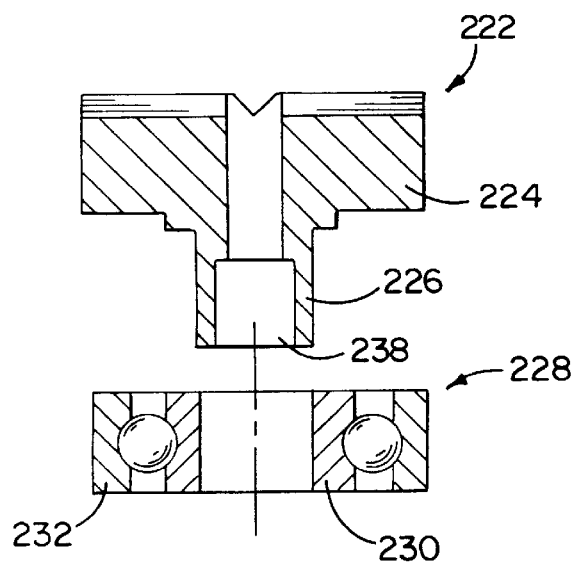
FIG. 29
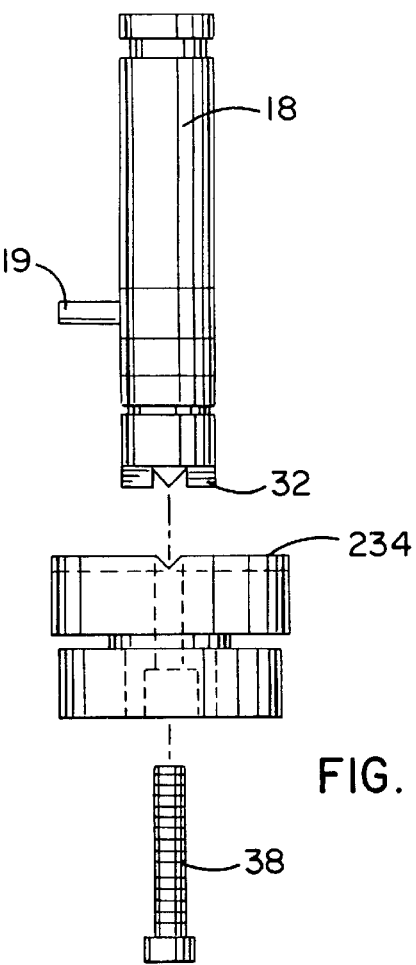
FIG. 30

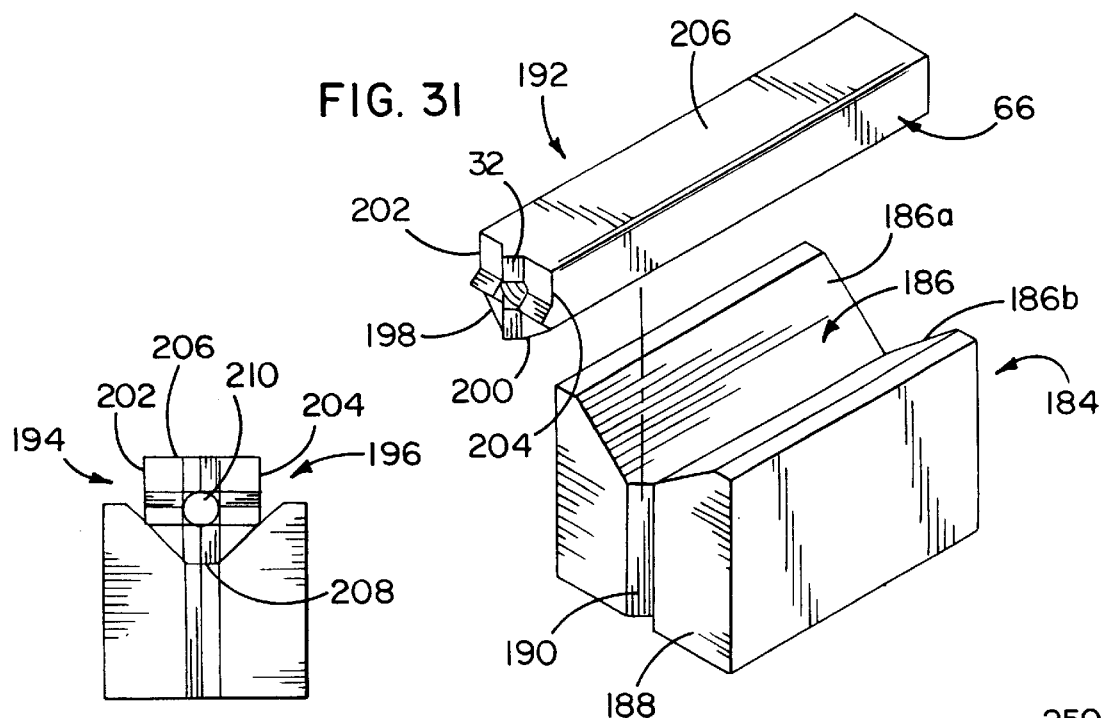
FIG. 31
FIG. 32
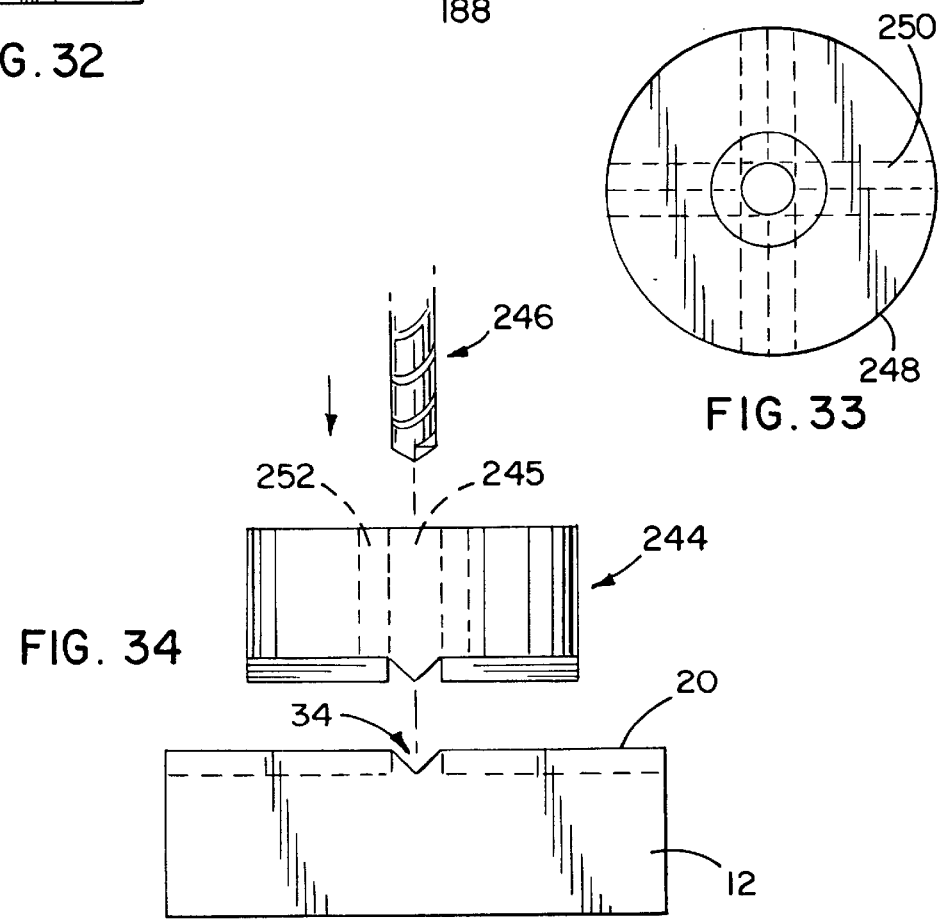
FIG. 33
FIG. 34

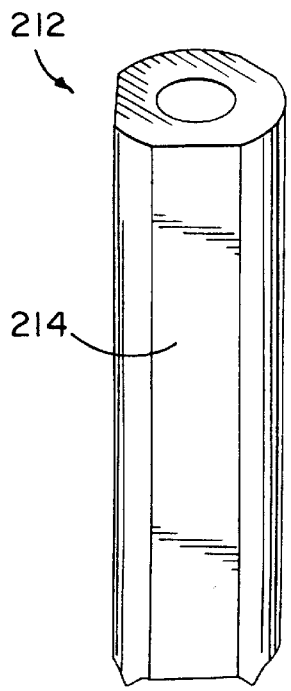
FIG. 35
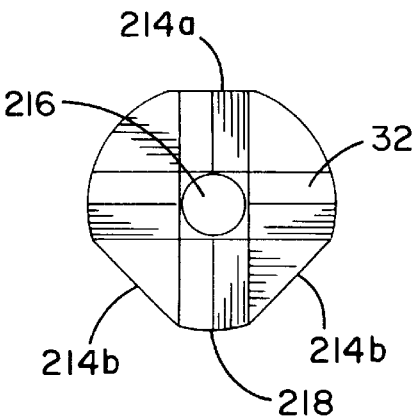
FIG. 36
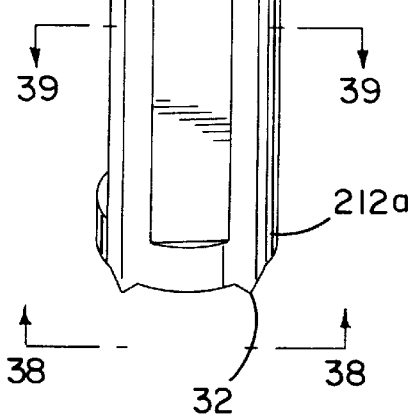
FIG. 37
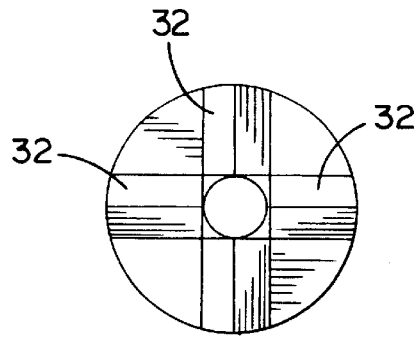
FIG. 38
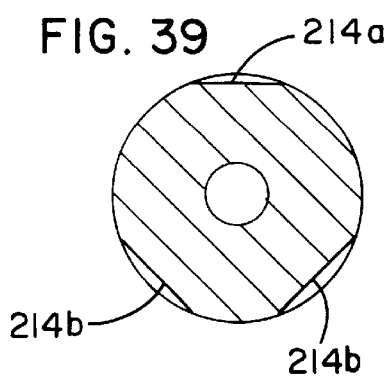
FIG. 39

TOOL HOLDING SYSTEM

This is a continuation of prior application number PCT/US98/26061, filed Dec. 9, 1998, which designates the United States of America, which in turn claims priority to United States Provisional Patent Application Nos. 60/069,121, filed Dec. 9, 1997; 60/083,744, filed May 1, 1998; and 60/107,542, filed Nov. 9, 1998, which we hereby incorporated herein by reference in their entirety.

FIELD OF THE INVENTION

The invention relates to tool holding systems, and, more particularly, to a system for holding electrodes for accurate machining thereof and electric discharge machining therewith.

BACKGROUND OF THE INVENTION

It is generally understood that to obtain good results in machining operations it is necessary to have both precisely formed cutting tools as well as fixturing for the tools and parts that provides for accurate and predictable relative alignment between the tool and the piece to be machined. This is particularly true in electric discharge machining (EDM). In an EDM process, the cutting tool is brought into close proximity to the metal work surface. The electrode cutting tool serves as the cathode and the metal workpiece is the anode in an EDM operation with voltage developed therebetween creating an electric arc which erodes the metal surface of the workpiece so that it assumes the shape of a mirror image of the proximate surface of the electrode. EDM operations allow for complex shapes such as intricately shaped cavities to be formed in workpieces that otherwise may be difficult to obtain with more conventional metal cutting types of machining operations. As is apparent, the shape and dimensions of the electrode are of paramount importance in terms of the final shape of the workpiece that is being machined with the EDM process.

Accordingly, electrode manufacture must permit for very precise, intricate shapes to be machined onto the electrode blank with a very high accuracy of repetition. Even assuming this occurs, the subsequent set up of the holder and electrode in an EDM machine if not done in a precise and predictable fashion can ruin a machining operation. For instance, it is known to use round shaped electrode posts that have a transverse indexing pin with the post adapted to be received in a round bore of a fixture block. The fixture block has four standing pins that are adjustably spaced ninety from each other about the fixture block bore for abutting the post indexing pin to angularly locate the post in a C direction. The bore includes a hydraulic chuck for clamping onto the post in a direction transverse to its axis to keep it fixed in the X and Y directions.

This system faces several shortcomings. Relying on adjustable standing pins to set the position of the post in the C direction is not very reliable as the pins may be adjusted in a different manner from one worker to the next. Further, it has been found that during machining of the electrode blank such as in milling or grinding operations, the hydraulic clamping provided by the block chuck may not keep the posts sufficiently stationary to provide for precise forming of the electrode.

Another problem with the EDM system described above is in typical post holders the mounting surface at the top of the post or on an enlarged flange thereof is a smooth flat surface with the electrode having a rear flat surface which is then glued to the post mounting surface for attaching the electrode thereto. To provide for extra holding force, a fastener can be threaded into aligned apertures of the post and the electrode through a throughbore countersunk in the post for inserting the fastener through the rear of the post and seating it in the counterbore therein. Where the electrode is adhered to the post, once the electrode is worn so that it is no longer useful for the particular EDM operation for which it is originally designed, both the electrode and the post holder to which it is adhered generally have to be disposed or stored for possible later use such as by modification thereto. This can result in a tremendous waste of electrode post holders as they are not able to be reused with different electrodes. In this regard, it is not unusual to see EDM machine shops stocking hundreds of posts with electrodes adhered thereto. Further, the glue attachment between the mounting surfaces of the post and electrode do not provide for X, Y and C direction locating of the electrode relative to the post.

Because the posts are generally disposed after the electrode is consumed, the fastener is typically advanced into a counterbore of the post for rear mounting of the electrode thereto, as there is no need to be able to access the fastener with the post received and held in its fixture. Accordingly, front mounting of the electrodes to the post such as via a counterbore in the electrode is not typically done.

There are post holders that have been developed which utilize a raised peg for being press fit in a corresponding opening in the electrode. However, this press fit system also relies upon glue to keep the electrode in place during machining operations and thus the post does not provide the advantage of being reusable with different electrodes. Similarly, other mounting systems have been used with cutouts or openings in one of the electrode and post for receiving projecting portions of the other of the electrode and post therein with fasteners for clamping of the electrode to the post also provided. However, each of these systems relies on very precise cutting or drilling operations to form the openings and/or projections in and on the post and electrode that are difficult to achieve to obtain accurate and reproducible mounting of the electrode to the post. Further, these systems do not provide consistent locating of the electrode to the post in the X,Y and C directions, as is desired.

In this regard, machinists have been known to use post holders formed of square stock having raised cross-shaped portions machined on the mounting face thereof for being interfit into a cross-shaped recessed groove machined onto the back of the electrode mounting surface for proper X,Y and C direction locating of the electrode on the post. However, this approach has not seen widespread acceptance due to some significant drawbacks therewith not the least of which is the fact that square tool holder posts are not readily available as standard items for EDM operations similar to round tool holder posts such as those offered by System 3R International AB of Sweden. One reason for this is the common use of v-fixtures for holding of the posts during machining operations for electrodes and workpieces. Where a square post is clamped onto a v-fixture, the exposed sides of the square post can extend generally at a 45° angle to the vertical which is undesirable for establishing the dimensions of the carbon electrode relative to the electrode holder as there are no vertical or horizontal flats to be used as reference faces.

Accordingly, there is a need for a tool holding system, and in particular a post holder for electrodes that allows for precise and repeatable positioning of the electrode relative to the posts in the X,Y and C directions, and which allows the posts to be reused with different electrodes with the electrodes being able to be repeatably mounted in known predetermined positions relative to the posts. The posts should allow a machinist to obtain accurate machined dimensions on the electrode when it is mounted thereto. In furtherance of the above, an electrode machining system that provides for precise fixturing of the electrode holder in known predetermined positions relative thereto would likewise be desirable.

SUMMARY OF THE INVENTION

In accordance with the present invention, a tool holding system is provided which allows for tools, and in particular electrodes to be removably attached on post holders in precise predetermined positions in terms of the location of the electrode relative to the posts in the X, Y and C directions. As the electrodes are releasably attached to the posts, it is critical for precise machining of the electrodes and for subsequent EDM operations that electrodes be attached to the posts in an accurate and repeatable manner. The present tool holding system utilizes interfitting surface portions which define predetermined positions of the tool on the post relative to the X-Y directions transverse to the post axis and the C-direction angularly about the axis so as to provide the necessary accurate and repeatable mounting of the electrode to the post. Further, the present invention includes an electrical discharge machining system including a fixture for the post which allows the post to be mounted and clamped thereto in a precise predetermined position thereon whether the post has a round cross-sectional configuration or a polygonal shape thereto. In a preferred form, the fixture includes a bore for a round shaped post having an indexing pin which seats in a groove formed in an upper surface of the fixture and is clamped therein by clamp members actuated by cam clamp operators. The clamping of the pin in the groove keeps the post rigid and stationary relative to the fixture to provide for improved results when the electrode is subject to machining operations. In addition, because the clamping mechanism herein does away with the previously-described hydraulic clamping device utilized with prior fixtures, there are no hydraulic lines or connections that have to be set up and maintained to provide an easier-to-use fixture for use with the tool holding system of the present invention.

In one form of the invention, a tool holding system is provided including a tool for removing metal material from a workpiece and having a rear mounting surface with an aperture formed therein. A tool holder is provided for mounting the tool in predetermined positions thereon and includes an elongate post having a longitudinal axis and a first end at which the tool is mounted and a second end opposite the first end along the axis. The post includes a longitudinally extending side surface parallel to the axis having one of: (1) a curved portion, and (2) at least two angled portions with their angles being at other than a right angle. The post has a tool mounting surface of the post at the first end thereof and with an aperture formed therein. The mounting surfaces include interfitting surface portions which cooperate to define the predetermined positions of the tool on the post relative to X-Y directions transverse to the post axis and a C-direction angularly thereabout with the apertures of the mounting surfaces being in alignment with each other. A fastener can be received in the aligned apertures to clamp the interfitting surface portions together with the tool located in one of its predetermined positions on the post for fixing the tool against shifting relative to the post during machining operations.

In a preferred form, the tool is an electrode for removing metal from a workpiece by electric discharge machining, and at least one of the electrode and post includes a throughbore to provide a removable attachment between the electrode and post with the fastener seated in the throughbore, and the interfitting surface portions cooperating to provide accurate and repeatable attachment of different electrodes onto the post. In this manner, the present invention provides machinists with the ability to obtain precisely formed and dimensioned electrodes, and further allows these electrodes to be used on a single post without having to dispose of posts once the electrode has been worn through use as with prior systems that utilize glue to hold the electrode to the post.

The interfitting surface portions can include mating raised and recessed portions extending in a generally cross-shaped pattern on the mounting surfaces with the apertures being generally centrally located thereon relative to the cross-shaped surface portions of the respective post and tool and aligned along the post longitudinal axis when the tool is fastened and clamped to the post in one of its predetermined positions thereon. Preferably, the mating raised and recessed portions are in the form of prismatic shaped raised and recessed portions of the tool and post.

Where the post side surface includes the at least two portions having their angles at other than a right angle, the two portions have opposite inclined flat sections and opposite parallel flat sections with the inclined flat and parallel sections of each portion meeting and defining an obtuse angle therebetween. A fixture having an predetermined generally v-shape is provided for the post described above for receiving the inclined flat sections thereof flush thereon with the parallel flat sections extending in a generally vertical direction. In this manner, the machinist has flat vertically oriented faces on the post for reference and from which they can obtain the dimensions of the electrode in a relatively easy and standard manner.

In another form where the post side surface includes the curved portion, the curved portion is provided with a round shape and the post has an indexing pin extending therefrom normal to the post axis. For this round shaped post, one fixture that can be used is a v-fixture having an upper surface with a predetermined generally v-shape, and a vertical surface having a vertical recessed groove extending downward centrally from the v-shaped upper surface with the groove receiving the indexing pin therein so as to provide accurate, repeatable positioning of the round post when clamped in the fixture.

In one form, the aperture of the tool includes an enlarged countersunk portion to allow for front mounting of the tool to the post with the fastener seated in the enlarged portion of the tool aperture. In this manner, when it is desired to replace the tool on the post such as when an electrode is consumed, an operator can readily access the fastener through the tool without having to release the post from its fixture in the machine. Thereafter, the next tool can be readily attached to the post through the front mounting provided by the tool.

In another form of the invention an electrical discharge machining system is provided including an electrode having a predetermined, precisely formed shaped and an electrode mounting post having a generally round cross-sectional configuration and a longitudinal axis extending therethrough. The electrode and post include mounting surfaces having mating portions which define a plurality of predetermined positions for mounting of the electrode to the post, and apertures in the mounting surfaces which are aligned with each other with the electrode located in one of its predetermined positions for receiving a fastener to clamp the mating portions together. The post includes an indexing pin extending normal to the longitudinal axis thereof. A fixture for the post is provided and includes a surface having a bore of round cross-sectional shape therein for receiving the round post. Grooves are recessed in the fixture surface and extend generally radially from the bore for receiving the indexing pin therein with the post in the bore. Clamp members are spaced from the groove for being shifted toward the grooves to clamp the pin in one of the grooves. Cam clamp operators are mounted to the fixture and are operable to shift the clamp members toward the grooves for clamping of the pin in the groove to locate the post angularly relative to the fixture for accurate machining of the electrode to form the precise predetermined shape thereof and of workpieces with the precisely formed electrode mounted to the posts.

The EDM system described-above is advantageous in providing positive locating of the electrode mounting posts relative to the fixture by way of the grooves. Further, the fixture provides for improved holding power due to the clamping action provided by one of the clamp members on the pin in the groove which is particularly important during machining operations on the electrode as with prior hydraulic clamping there was a tendency for the posts to shift when exposed to high cutting forces on the electrode which limited the ability to obtain the precision necessary for forming the desired precise shaped thereon.

Another aspect of the invention is a method for machining with a reusable electrode holder. The method includes providing electrodes and a mounting post therefor with mounting surfaces having interfitting surface portions to provide predetermined mounting positions of the electrodes on the post, seating one electrode on the mounting post in one of the predetermined positions with the interfitting surface portions in mating relation to each other, clamping the interfitting surface together with a fastener received in aligned apertures of the electrode and post, performing one of a standard metal cutting machining operation on the one electrode for forming precision electrodes and an electric discharge machining operation on a workpiece with the one precision electrode fastened and clamped to the post, releasing one of the precisely formed electrode, and the one used and worn electrode from the post by removal of the fastener, replacing the one electrode with a different electrode on the post with a second electrode in one of the predetermined positions on the post in an accurate and repeatable manner due to the provision of the interfitting surface portions for one of precise machining of the second electrode, and electric discharge machining with the precision formed second electrode.

BRIEF DESCRIPTION OF THE DRAWINGS

FIG. 1 is a perspective view of an electrical discharge machining system in accordance with the present invention showing an electrode mounted to an electrode mounting post for cutting a workpiece by an electrical discharge machining operation;

FIG. 2 is an exploded view of the electrode and mounting post showing the cross-shaped raised portion formed on a mounting surface of the post;

FIG. 3 is an end elevational view taken along line 3—3 of FIG. 2;

FIG. 7 is a view taken along line 7—7 of FIG. 6;

FIG. 8 is a cross-sectional view taken along line 8—8 of FIG. 6;

FIG. 9 is a cross-sectional view of an alternative electrode having a threaded aperture for rear mounting of the electrode to the post;

FIG. 10A is an exploded elevational view of the electrode and the electrode mounting post of FIG. 2;

FIG. 10B is an exploded elevational view similar to FIG. 10A utilizing a threaded insert adapter to allow a smaller electrode to be mounted to the post;

FIG. 10C is an exploded elevational view similar to FIGS. 10A and 10B showing an electrode mounting post having an enlarged flange to which a large electrode is front mounted thereto;

FIG. 10D is an exploded elevational view similar to FIGS. 10A–10C showing an electrode mounting post having an enlarged mounting flange to which a large electrode is rear mounted thereto;

FIG. 12 is a sectional view of the assembled electrode, right angle adapter and electrode mounting post;

FIG. 24A is a schematic plan view of an alternative fixture block mounting surface with the grooves offset about the bore;

FIG. 24B is a schematic plan view of an alternative post showing the indexing pin thereof in an offset position for fitting into the grooves of the fixture block of FIG. 24A;

FIG. 25A is a perspective view of a v-shaped angle plate having a groove at its corner;

FIG. 25B is a plan view of the angle plate of FIG. 25A showing the indexing pin of the electrode mounting post capable of being received in the groove of the angle plate;

FIG. 26 is a perspective view of an indicator spindle assembly for use with the electrode mounting post of the present invention;

FIG. 27 is an elevational view of a stationary member and a roller bearing of the indicator spindle assembly of FIG. 26;

FIG. 28 is an end elevational view taken along line 28—28 of FIG. 27;

FIG. 29 is an exploded sectional view showing the stationary member including a depending shaft for being press fit in an inner race of the roller bearing and a cross-shaped recessed portion for mating with the cross-shaped raised portion of the electrode mounting post;

FIG. 30 is an exploded elevational view of the post and the stationary member press fit to the roller bearing;

FIG. 31 is a perspective view of an alternative polygonal post configuration for being received in a v-block fixture;

FIG. 32 is an end elevational view of the alternative polygonal post seated on the upper V surface of the fixture;

FIG. 33 is a plan view of a drill guide for forming an aperture in the electrode of the present invention;

FIG. 34 is an elevational view showing the drill guide having a raised cross-shaped portion for mating in the electrode recessed cross-shaped portion;

FIG. 35 is a perspective view of an alternative cross-sectional shape for the electrode mounting post;

FIG. 36 is an end elevational view taken along line 36—36 of FIG. 35;

FIG. 37 is a perspective view of yet another alternative post construction having flats formed along the majority of its length on the sides thereof;

FIG. 38 is an end elevational view taken along line 38—38 of FIG. 37; and

FIG. 39 is a cross-sectional view taken along line 39—39 of FIG. 38.

DETAILED DESCRIPTION OF THE PREFERRED EMBODIMENTS

Figure 4:
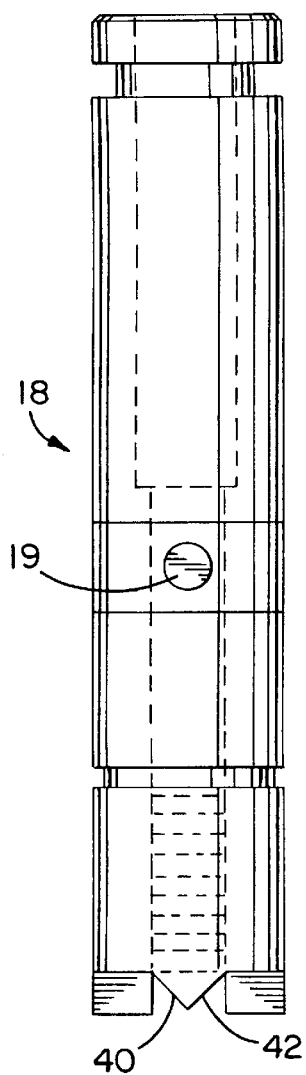
FIG. 4 is a side elevational view taken along line 4—4 of FIG. 3.

In FIG. 1, an electric discharging machining system, generally designated 10, is shown in accordance with the present invention where an electrode 12 such as of a carbon material serves as the cutting tool for a workpiece 14 of metal material. As shown, the tool is fixtured and clamped onto a platen 15 of an EDM machine that moves the electrode 12 vertically with respect to the workpiece 14 to cut the workpiece 14 to its desired shape.

The EDM system 10 herein utilizes a tool holding system 16 such as depicted in FIG. 2 that mounts the electrode 12 to a tool holder in the form of an electrode mounting post 18 at a first or forward end 18a thereof.

The present tool holding system 16 allows the electrode 12 to be mounted to the post 18 in precise predetermined positions thereon in an accurate and repeatable manner. This is of particular importance in forming electrodes 12 so that reference positions can be established with respect to the posts 18, such as relative to the position of an indexing pin 19 for the illustrated round cross-sectional posts 18 for obtaining proper dimensions of the electrode 12, and for when the precision formed electrode 12 is worn by use requiring that the consumed electrode 12 be replaced with a different precision formed electrode 12 in the same or known predetermined position relative to the post 18. Establishing accurate positioning of subsequent electrodes 12 on the same post 18 is critical in terms of minimizing setup time, particularly where the workpiece requires three or four electrodes which are consumed before the shape is established in the workpiece 14. Because the electrodes 12 can be removed from the post 18 and different electrodes 12 can be replaced thereon at a precise and repeatable position relative thereto, there is no need to have a number of different posts 18 in inventory as is currently the case where the electrodes 12 are glued to the post 18. With the glued electrodes, once the electrodes are consumed, both the posts and electrodes adhered thereto are disposed of or stored and replaced with another glued post and electrode assembly which must be then properly and accurately fixtured and setup in the EDM machine in time consuming operations that the present invention avoids.

Referring more specifically to FIGS. 2–8 for describing the tool holding system 16 herein, the electrode 12 and post 18 are provided with respective mounting surfaces 20 and 22 that are configured so as to locate the electrodes 12 in predetermined positions thereon. More specifically, the electrode rear mounting surface 20 and the mounting surface 22 of the electrode mounting post 18 each include an interfitting surface portion 24 and 26, respectively, which cooperate to define the predetermined positions of the electrode 12 on the post 18 relative to X-Y directions transverse to longitudinal axis 28 of the post 18 and in a C-direction angularly thereabout (see FIG. 21B for disposition of X, Y and C reference directions).

The interfitting surface portion 24 of the electrode 12 includes recesses 30 formed in the electrode rear mounting surface 20, and the interfitting surface portion 26 of the post 18 includes raised projections 32 with the recesses 30 and raised projections 32 having complementary shapes so that they mate together when the mounting surfaces 20 and 22 are brought together for mounting the electrode 12 to the post 18. The mounting surfaces 20 and 22 each include respective apertures 34 and 36 formed therein for receiving a fastener 38 either by front mounting or rear mounting thereof, as will be described more particularly hereinafter, for clamping of the interfitting surface portions 24 and 26 together. With the electrode 12 mounted to the post 18 in any one of its predetermined positions thereon with the raised projections 32 of the post 18 mated in the recesses 30 of the electrode 12, the apertures 34 and 36 will be aligned for receiving a fastener 38 therein.

Figure 6:
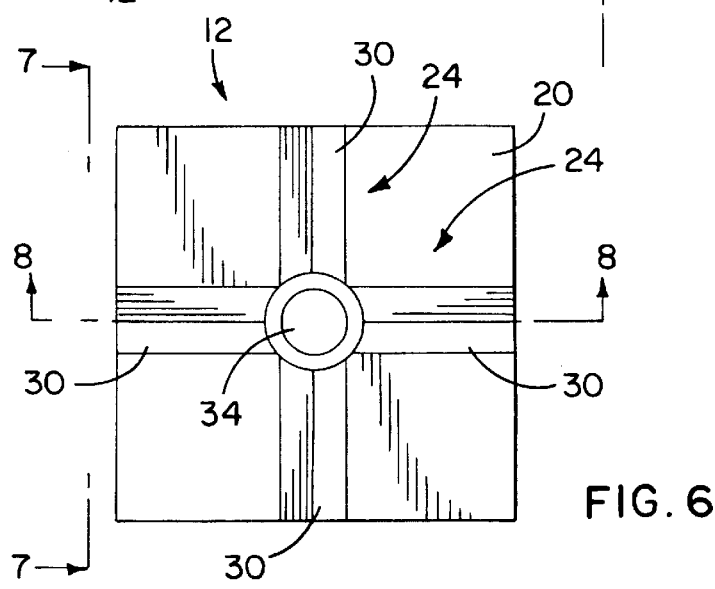
FIG. 6 is an end elevational view of the electrode showing the mounting surface thereof including the cross-shaped recessed portion for mating with the raised cross-shaped portion of the post.

In the preferred and illustrated form, the raised projections 32 are provided with a prismatic shape having side inclined faces 40 and 42 that project above the mounting surface 22 and meet an apex of the prismatic projection 32. Similarly, the recesses 30 include opposite inclined sides 44 and 46 that are recessed below the electrode rear mounting surface 20 and meet at an inverted vertex thereof to provide the recesses 30 with a prismatic shape complementary to the prismatic shape of the projections 32. In addition, the recesses 30 and projections 32 are preferably formed in a cross-shaped pattern as best seen in FIGS. 3 and 6 with the apertures 34 and 36 being formed centrally in the electrode 12 and post 18 where the cross-shaped pattern of the recesses 30 and raised projections 32 would intersect absent the apertures 34 and 36 being formed thereat. Accordingly, when the electrode recesses 30 and post projections 32 are mated together, the apertures 34 and 36 are aligned along the post central longitudinal axis 28 so as to provide for consistent and reproducible centering of the electrode 12 on the post 18 in any of four predetermined positions defined thereon by the four projections 32 and corresponding recesses 30. As can be seen in FIGS. 3 and 6, the sections of the interfitting surface portions 24 and 26 in the form of the recesses 30 and raised projections 32 extend radially from their respective apertures 34 and 36 and are spaced from adjacent ones of the recesses 30 and projections 32 ninety degrees about the apertures 34 and 36 so as to provide the four predetermined positions of the electrode 12 on the electrode mounting post 18. Further, the indexing pin 19 is angularly aligned about the post axis 28 with one of the projections 32 so that the position of electrodes 12 relative to the post pin 19 will always be known and be reproducible from one electrode 12 to the next.

The recesses 30 and raised projections 32 can be formed on the respective electrode rear mounting surface 20 and tool mounting surface 22 of the electrode 12 and post 18 in a simple and precise manner without having to be too concerned with the centering and aligning of the surfaces 20 and 22 of the respective electrode 12 and post 18 relative to the cutting machine. This is unlike other electrode mounting systems that utilize raised pegs or pins for fitting into corresponding openings in the electrode or an adapter therefor which require very precise and close tolerance drilling operations to form the openings consistently from one electrode to the next with subsequent reaming operations that hit the hole dead center for proper hole formation. In addition, the pegs or pins have to be located on the electrode or adapter at precise positions to fit in the properly formed openings. In contrast, the prismatic recesses 30 and projections 32 can be formed such as with grinders that are moved along the X and Y axes of the electrode and the post for cutting the faces 40–46 of the recesses 30 and the projections 32. In these grinding machines, the work or fixture therefor can be aligned against a guide rail for machining one face 44 or 46 of the recess 30 with the electrode then rotated 180 degrees and abutted against the guide rail of the machine for forming the other face 44 and 46 of the recess 30. The post mounting surface 22 can be machined in a similar fashion such as with a grinding wheel with the fixture therefor aligned against the rail and rotated 180 degrees for completing both faces 40 and 42 of the projection 32. Thus, the machining for forming the recesses 30 and projections 32 occurs in the same plane without requiring any relative vertical movement between the piece being machined and the cutter as the cutter is run across the surfaces 20 and 22 at right angles to the axes of the bodies of the electrode 12 and the post 18.

Figure 5:
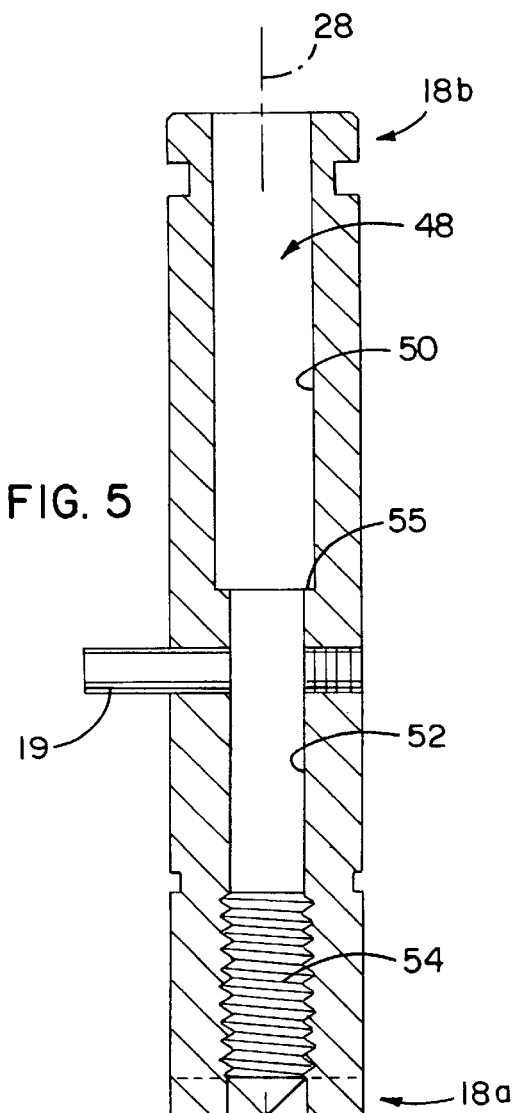
FIG. 5 is a cross-sectional view taken along line 5—5 of FIG. 3.

In typical electrodes that are glued to mounting posts, there are central apertures similar to the apertures 34 and 36 for receiving a fastener similar to fastener 38; however, these fasteners are typically rear mounted from the rear end 18b of the electrode mounting post 18 into a counterbore similar to counterbore 48 shown in electrode mounting post 18 depicted in FIGS. 4 and 5. As previously discussed, rear mounting of an electrode to the post is of no moment where the electrode is glued to the post as both are usually disposed of or put away in storage after the electrode has been consumed. In other words, because the electrode generally cannot be removed from the post without causing undesirable damage thereto, there is no need to be able to readily access the fastener once the electrode has been mounted and glued to the post.

The counterbore 48 of the post 18 as shown in FIGS. 4 and 5 includes an enlarged diameter portion 50 which steps down to a smaller diameter portion 52 that is provided with threads 54 at its forward end adjacent forward end 18a of the post 18. Thus, a fastener such as threaded shoulder bolt fastener 38 can be inserted into the counterbore 48 with the head 38a of the fastener seating on the shoulder 55 formed between the bore portions 50 and 52 and the threaded end 38b of the fastener threaded to threads 54 of the post 18 and into the threads 56 of aperture 34 provided in electrode 12 (FIG. 9).

However, since the present invention is specifically adapted for reusing the electrode mounting posts 18 with different electrodes 12 placed thereon, easy access of the fastener 38 to the machinist operator is important without having to remove the electrode mounting post 18 from its fixturing to gain access to the rear 18b of the post 18 such as where the fastener 38 is rear mounted in a counterbore 48 provided in the post 18. Accordingly, the present invention also contemplates forming a counterbore 58 in the electrode 12 such as shown in FIGS. 7 and 8. The counterbore 58 has an enlarged diameter countersunk portion 60 which steps down to a smaller diameter portion 62 in aperture 34 with the head 38a of the fastener 38 seated on the shoulder 64 formed between the counterbore portions 60 and 62 and threaded into the forward threads 54 of the post 18. With the fastener 38 received and seated in the counterbore 58 of the electrode 12, the fastener head 38 can be easily accessed through the front of the electrode 12 as by an Allen wrench for unscrewing the fastener 38 from the threads 54 of the post 18 to allow for removal of the electrode 12 and replacement with a different electrode 12 for additional EDM operations or for precision forming of an electrode 12 from a blank therefor having recesses 30 machined therein for mating on the projections 32 of the post 18.

FIG. 10A is an exploded view of a post 18 and electrode 12 having the counterbore 58 formed therein for receiving the fastener 38 for front mounting of the electrode 12 to the post 18, as previously described. FIG. 10b is another exploded view of the post 18 which can be of a standard configuration except for that of the tool mounting surface 22 thereof as it has a side surface 66 that has a round cross-sectional shape which can be of a twenty millimeter outer diameter and can be obtained from System 3R International AB with the projections 32 of the mounting surface 22 subsequently machined thereon, as previously described. To use a slightly smaller electrode 12a with the standard twenty millimeter diameter post 18, an adapter insert 68 is provided. The adapter insert 68 can take the form of a sleeve-shaped stud that is both internally and externally threaded as the counterbore 70 of the smaller electrode 12a will be proportionally smaller than the counterbore 58 for the larger electrode 12 such that a smaller fastener 72 is required for use with the electrode 12a for fitting the smaller counterbore 70. The threads on the fastener 72 will not mesh with the forward threads 54 of the post 18 due to the smaller size of the fastener 72 and hence the need for the threaded adapter stud 68. The external threads of the stud 68 are sized to fit into the forward threads 54 of the post 18 and the internal threads of the stud 68 will mesh with the threads on the fastener 72 so as to allow the smaller electrode 12a to be mounted to the post 18 for use therewith.

FIGS. 10c and 10d show standard types of System 3R electrode mounting posts 74 and 76 that have been modified in accordance with the invention and which are used for mounting very large electrodes such as electrodes 78 and 80, respectively. The mounting posts 74 and 76 are provided with enlarged mounting flanges 82 and 84 which are modified to include the post mounting surface 22 thereon configured with the prismatic projections 32 for mating in prismatic recesses 30 formed in the rear mounting faces 20 of the large electrodes 78 and 80. The mounting flange 82 can have a 35 millimeter outer diameter while the mounting flange 84 is larger and can be provided with a 50 millimeter outer diameter. As shown, the electrode 78 has a counterbore 86 for front mounting thereof to the post flange 82, whereas the aperture 34 of the electrode 80 is tapped for rear mounting thereof to the post flange 84.

Figure 11:
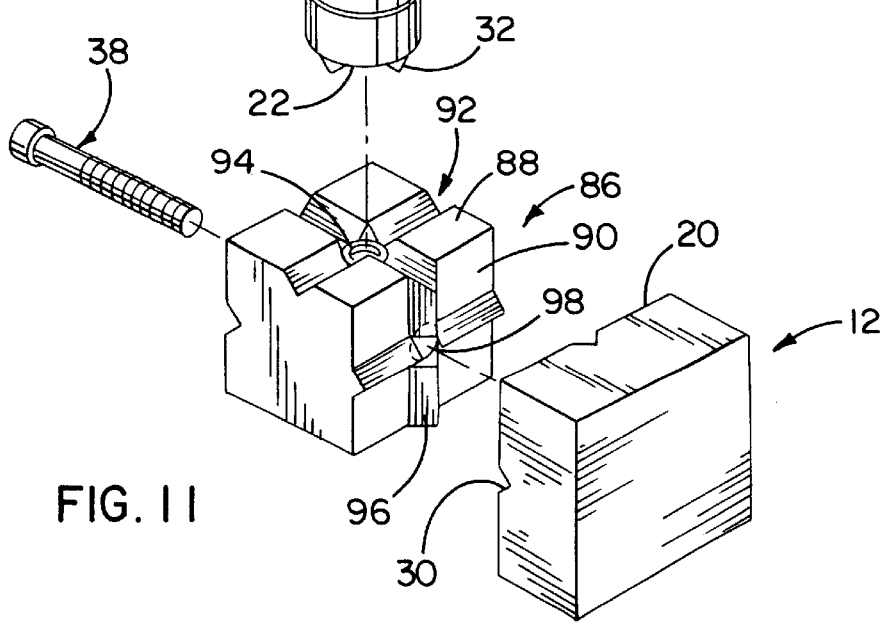
FIG. 11 is an exploded perspective view of a right angle adapter for use with the electrode and electrode mounting post of the present invention.
Figures 14, 15, 16:
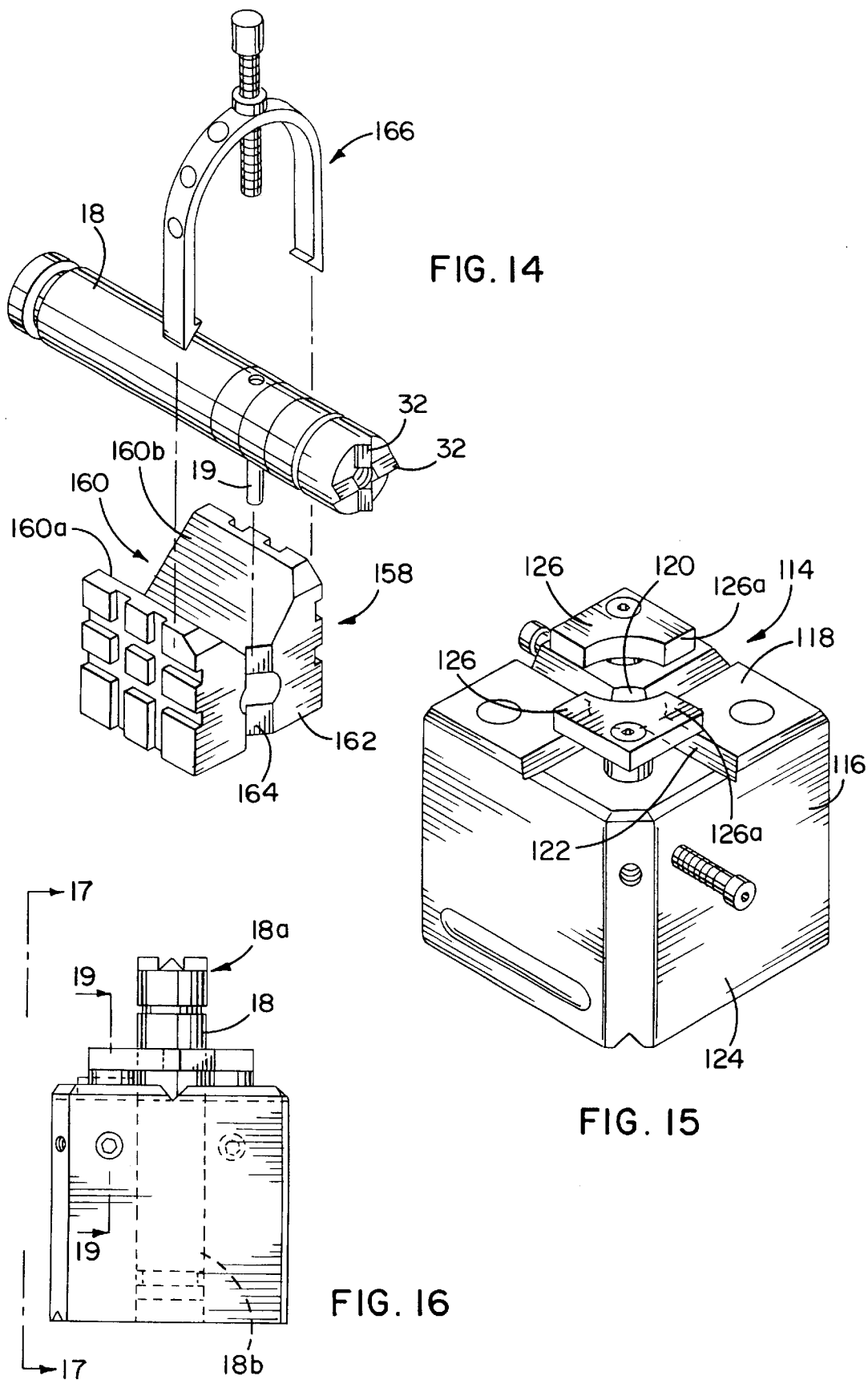
FIG. 14 is an exploded elevational view of an electrode mounting post to be clamped into a v-block fixture.
FIG. 15 is a perspective view of a block fixture for the electrical discharge machining system of the present invention.
FIG. 16 is an elevational view of the block fixture having an electrode mounting post received in a central bore formed therein.

In certain EDM operations, it may be desirable to have the electrode 12 face in a direction that is transverse to the post axis 28. For this purpose, a right angle adapter 86 is provided as an accessory to the tool holding system 16 herein, as shown in FIGS. 11 and 12. The right angle adapter 86 has a pair of mounting surfaces 88 and 90 that extend at right angles to each other such as provided on the illustrated cube-shaped form of the adapter 86. The mounting surface 88 is adapted to be fitted and clamped to the mounting surface 22 on the post 18, and the mounting surface 90 is adapted to be fitted and clamped to the rear mounting surface 20 of the electrode 12 as by respective fasteners 38.

More specifically, the surface 88 includes recessed portions 92 that are preferably formed with a prismatic shape to mate with the preferred prismatic shaped projections 32 formed on the post surface 22. The prismatic recesses 92 extend radially from a threaded central bore 94 at ninety degree intervals therearound with the bore 94 being aligned with the bore 48 of the post 18 when the projections 32 are mated in the recesses 92. As shown, the fastener 38 can be rear mounted through the post 18 and threaded into the bore 94 of the adapter block 86 for clamping the interfitting surface portions 32 and 92 together.

Similarly, the surface 90 can include raised surface portions 96 that are preferably formed with a prismatic shape to mate in the preferred form of prismatic shape recesses 30 formed on the rear mounting surface 20 of the electrode 12. The prismatic raised projections 96 extend radially from central counterbore 98 formed in the right angle adapter block 86 at ninety degree intervals around the bore 98. The bore 98 extends at right angles to the bore 94. Thus, when the recesses 30 of the electrode 12 are mated onto the projections 96 of the adapter 86, the adapter bore 98 will be aligned with the electrode aperture 34 so that shoulder bolt 38 can be seated in the counterbore 98 and threaded into the tapped aperture 34 of the electrode 12 for clamping the electrode recesses 30 onto the projections 96 to rear mount the electrode 12 to the surface 90 of the adapter block 86. In this manner, the electrode 12 faces at right angles to the post axis 28.

Figure 13:
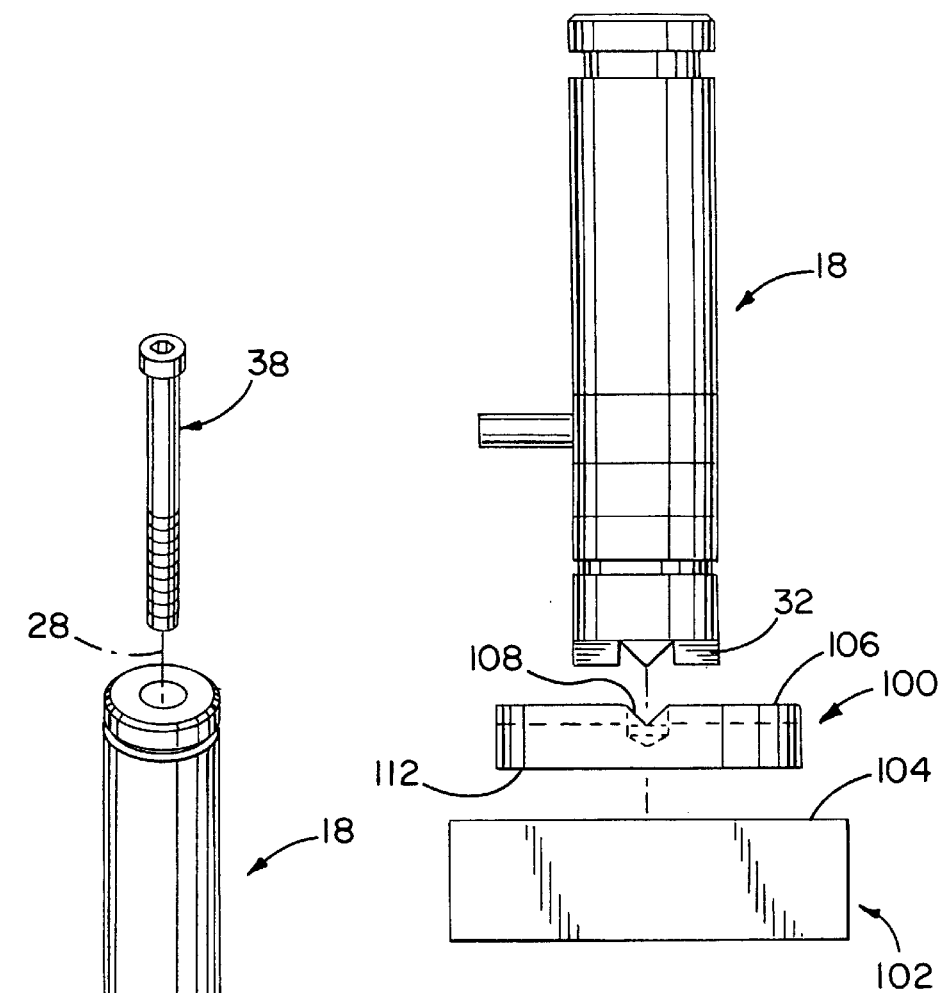
FIG. 13 is an exploded elevational view of an adapter to allow the electrode mounting posts of the present invention to be used with electrodes having smooth, flat rear mounting surfaces for gluing to the adapter.

FIG. 13 is directed to another adapter 100 which allows the post 18 of the present invention to be used with electrodes 102 that are adapted to be used with standard types of electrode mounting posts having flat electrode mounting surfaces thereof to be glued thereto such as provided by System 3R, as previously described. To this end, adapter 100 includes a post mounting surface 106 that is adapted to the engaged and clamped to the mounting surface 22 of the post 18 as by the provision of recessed portions 108 thereof. Preferably the recessed portions 108 take the form of prismatic shaped recesses for mating with the preferred form of the prismatic shaped projections 32 formed on the mounting surface 22 of the post 18. The prismatic recesses 108 extend radially from a tapped aperture 110 of the adapter 100 at ninety degree intervals therearound so that when the projections 32 are fitted in the corresponding recesses 108, fastener 38 can be utilized to clamp the interfitting surface portions 32 and 108 together. On the opposite side from the recesses 108 on the adapter 100, there is provided an electrode mounting surface 112 that has a flat, smooth configuration. The flat mounting surface 112 allows the electrode 102 including its flat rear face 104 to be glued to the adapter 100 that is clamped onto the post 18 of the present invention in a manner similar to that performed with currently available System 3R electrode posts. The outer diameter of the adapter 100 can be varied to suit the particular size of the electrode that is to be attached and adhered thereto.

Referring next to FIGS. 15–23, there is shown a fixture 114 in accordance with the present invention that is adapted to receive and mount the round post 18 therein in predetermined positions relative thereto in a reliable rigid and sturdy manner. The fixture 114 has a body 116 with an upper mounting surface 118 in which a central bore 120 is formed. The central bore 120 has a circular or round cross-sectional shape so that the post 18 with the round cross-sectional side surface 66 thereof can be fit therein. The mounting surface 118 has radial grooves 122 recessed therein and spaced at ninety degree intervals about the bore 120 and aligned with the mid-point of each of the side walls 124 of the cube. The grooves 122 can be formed in substantially the same manner as those on the electrodes 12 of the present invention so that they have a prismatic shape with inclined side walls 123 thereof.

Figure 17:
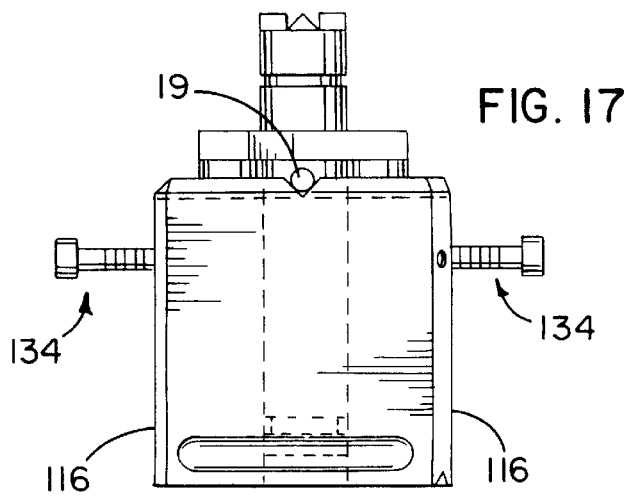
FIG. 17 is an elevational view taken along line 17—17 of FIG. 16.

When the round post 18 is to be mounted to the fixture 114, the post end 18b is inserted into the bore 120 with the indexing pin 19 advanced toward the mounting surface 118. To provide predetermined positioning of the post 18 with respect to the fixture body 116, the pin 19 is seated in one of the grooves 122, as shown in FIG. 17. Accordingly, the post 18 has four predetermined positions with respect to the fixture block body 118 as defined by the four radial grooves 122 formed therein. The fixture block 118 is useful for the mounting of prior art types of posts as provided by System 3R as well as the posts 18 of the present invention including the interfitting surface portion 26 thereof so as to provided an EDM system 10 in accordance with the present invention that provides precise locating and alignment between the posts 18 and the electrode 12 mounted thereto, as well as to the fixture 114 to which the posts 18 herein can be mounted, such as shown in FIG. 1.

Another significant improvement of the present fixture 114 having the block-shaped body 116 is the provision of the mechanical clamping action onto the indexing pin 19 located in one of the grooves 122 formed in the body mounting surface 118.

As previously discussed, prior fixture blocks of this type for round posts utilized a hydraulic clamping chuck about the corresponding bore which clamped the post 18 in a direction transverse to its longitudinal axis. It has been found that, in particular during machining of electrode blanks, the post may shift when subject to the high cutting forces as the metal cutter is advanced and plunged into the blank. As previously discussed, this is unacceptable for providing high precision electrodes with proper dimensions and surface finish.

By contrast, the present invention utilizes a mechanical clamping action on the indexing pin 19 in a direction parallel to the post axis 28 which is effective to keep the posts from shifting in the X, Y, Z and C directions as the clamping action occurs on the pin 19 in one of the grooves 122 of the fixture block. By locating the pin 19 in the groove 122, and exerting a longitudinally directed clamping force along the Z axis against the pin 19, the pin 19 will be tightly captured in the groove to prevent it from shifting in the Z-direction out therefrom and also clamped against inclined sidewalls 123 of the groove 122 so as to prevent angular shifting about the post axis 28 in the C-direction.

To exert this mechanical clamping action on the pin 19, there are provided a pair of identical clamp members 126 that are disposed on opposite sides of the bore 120 relative to each other and are spaced from the grooves 122 formed in the fixture block mounting surface 118. The clamp members 126 are preferably L-shaped with ends 126a thereof disposed over grooves 122 so that only two L-shaped clamp members 126 are necessary to achieve clamping of the pin 19 in any of the four grooves 122.

Figure 18:
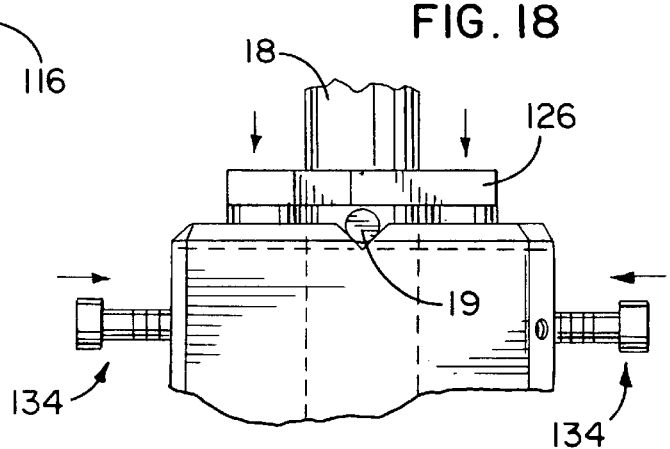
FIG. 18 is a fragmentary elevational view similar to FIG. 17 showing the cam clamp operators being advanced to draw down clamp members onto the pin of the post located in a groove on a mounting surface of the fixture block.
Figure 19:
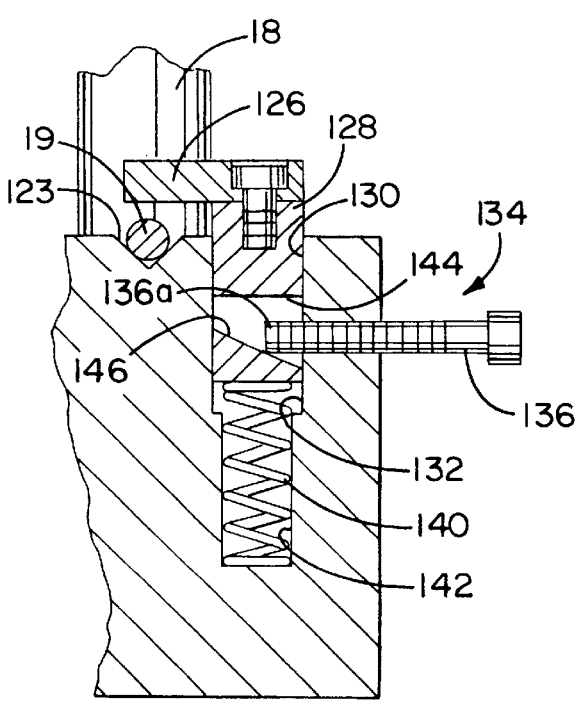
FIG. 19 is a sectional view taken along line 19—19 of FIG. 16 showing a clamp member spaced over the indexing pin of the electrode mounting posts.
Figure 20:
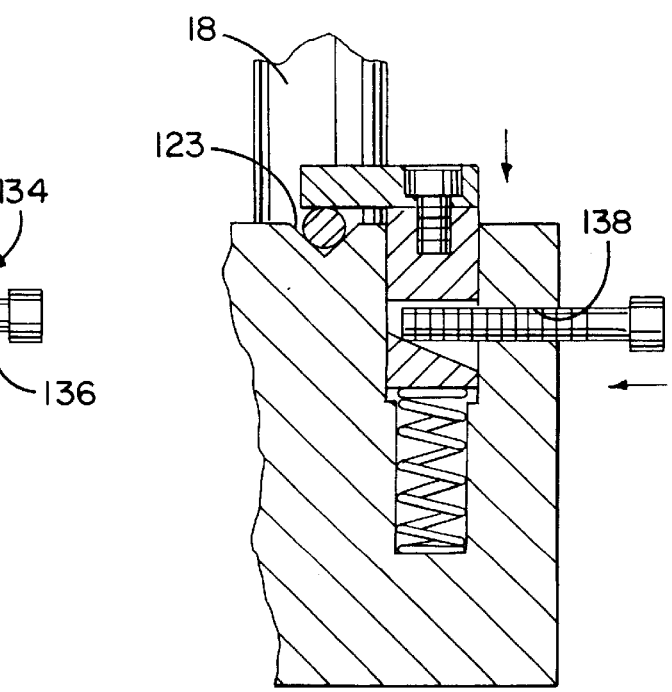
FIG. 20 is a sectional view similar to FIG. 19 showing the cam clamp operators advanced to draw the clamp member down onto the pin.

The clamp members 126 are fixed to the top of stem shafts 128 which are disposed in a counterbore 130, and in particular the enlarged diameter portion 132 thereof. For shifting of the clamp members 126 toward the grooves 122, associated cam clamp operators 134 are mounted to opposite sidewalls 116, as best seen in FIGS. 18–20. The operator 134 can take the form of fasteners 136 having threads thereon for being threaded into threaded apertures 138 provided in sidewalls 116 and opening to the enlarged portion 132 of the counterbores 130. Rotation of the fasteners 136 so as to advance them into the counterbore 130 draws the stem 128 of the clamp member 126 further into the counterbore portion 132 to bring the clamp member 126 down toward the groove 122 for clamping on the indexing pin 19 located therein.

More particularly, the stem shaft 128 is biased out from the counterbore 130 by a biasing mechanism in the form of coil spring 140 disposed in small diameter portion 142 of the counterbore 130 below the enlarged portion 132 thereof and having its upper end engaged against the bottom of the stem shaft 128. To allow the fastener 136 to draw the stem 128 down into the counterbore portion 132, the stems 128 are provided with a transverse throughbore 144 aligned with the apertures 138 in the block sidewalls 116. The throughbore 144 can be provided with an inclined cam surface 146 along the lower portion thereof so that as the fastener 136 is advanced into the throughbore 144, the distal end 136a thereof will engage against the inclined surface 146 and cam thereagainst to draw the stem shaft 128 down toward the bottom of the counterbore portion 132, as shown in FIGS. 19 and 20. Alternatively, the fastener operators 148 can be provided with an eccentric projection or pin 150 that extends from their distal end into the throughbore 144 so that rotation of the operator 148 in the advancing direction will bring the end of the eccentric pin 150 into engagement with the cam surface 146 to draw the stem shaft 128 down into the counterbore portion 132, as previously described. With the eccentric pin 150 on the operator 148, a cam surface 146a that does not have to be inclined can be utilized. In this regard, alternative cam surface 146a is horizontally disposed as shown in dashed lines, in FIGS. 22 and 23.

Figure 21A:
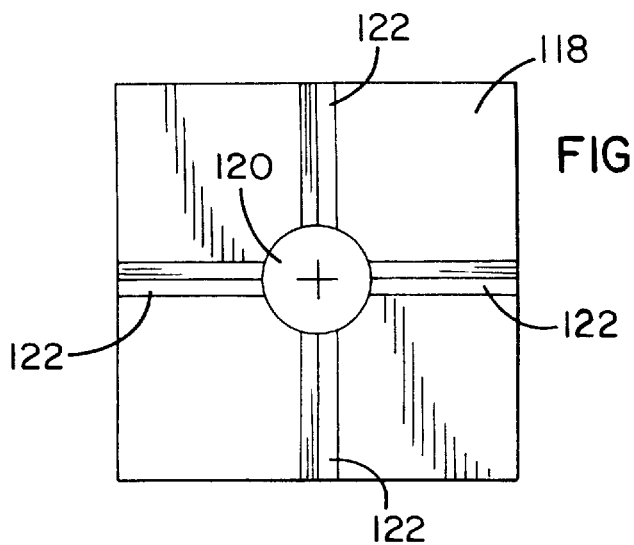
FIG. 21A is a schematic plan view of the fixture block without the clamping mechanism thereof showing the mounting surface with the bore and radially extending grooves formed at ninety degree intervals thereabout.
Figure 21B:
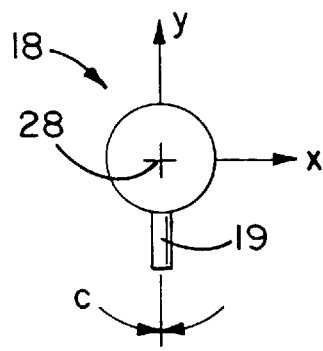
FIG. 21B is a schematic plan view of the electrode mounting post showing the different reference X, Y and C directions relative thereto.
Figure 22:
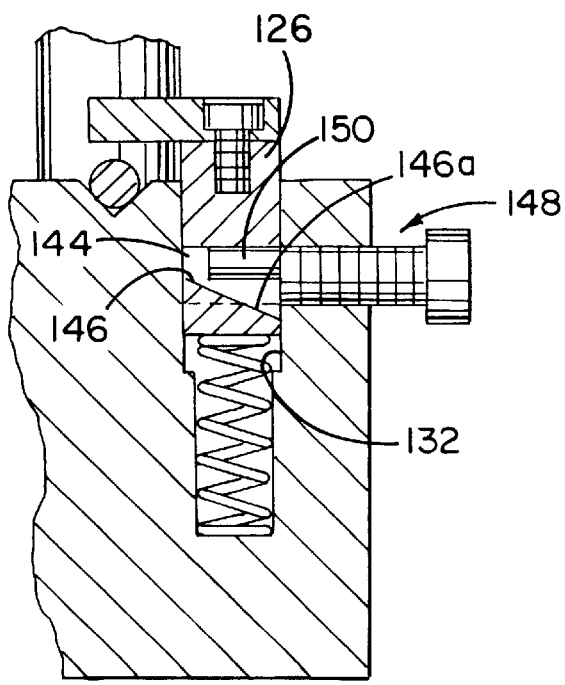
FIG. 22 is a sectional view showing an alternative cam clamp operator for the fixture block.
Figure 23:
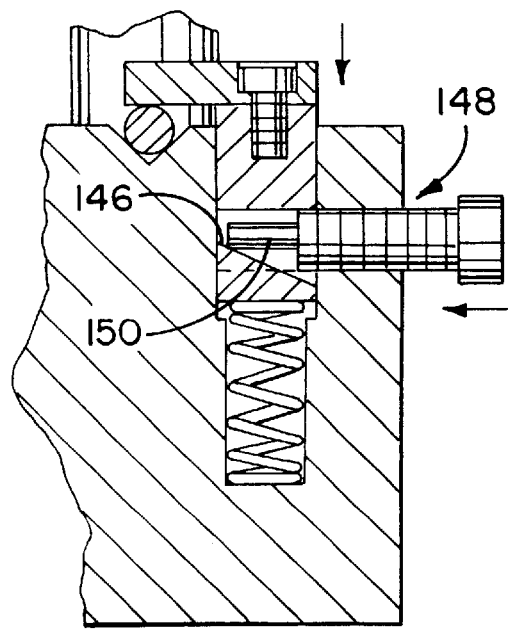
FIG. 23 is a sectional view similar to FIG. 22 showing the alternative cam clamp operator advanced to draw down the clamp member for indexing pin of the post in the fixture groove.

FIGS. 21a is a plan view of the mounting surface 118 of the fixture block with the clamp members 126 removed, and FIG. 21b is a plan view of the post 18 for illustrating how the pin 19 can be seated in any of the four grooves 122 with the post 18 received in the bore 120. It is also possible that where the pin 19 is offset from the center axis 28 of the post 18 as in FIG. 24b, that this type of post 18 can also be used with a fixture 152 in accordance with the present invention similar to fixture 114 except with its grooves 154 offset from the center axis of the bore 156 so that they are disposed closer to one corner of the fixture block 152 than another while still being spaced at ninety degree intervals about the bore 156. Thus, with the post 18 having the offset pin 19 received in the bore 156, the offset pin 19 can seat into any one of the four grooves 154 of the modified fixture block 152.

Another common type of fixture for use with electrode mounting posts are those having generally v-shaped receiving surfaces onto which the posts are clamped. In this regard, the present invention also includes a v-fixture 158 that has an upper surface 160 thereof with a predetermined generally v-shape. With round posts clamped into prior v-fixtures, it was very difficult to locate the posts in precise positions to obtain accurate machining of the electrode and if used as the fixture for the subsequent EDM operation for alignment with the work to be cut. However, the v-fixture 158 of the present invention has a vertical front surface 162 which is provided with a central vertical groove 164 therein that extends downward from the juncture of the surface portions 160a and 160b. Accordingly, the v-fixture 158 with the groove 164 provides for predetermined positioning of round posts having a transverse index pin as when the post is placed onto the v-surface 160, the pin 19 can be seated in the groove 164 with the post then being clamped as by clamping mechanism 166 to the v-surface 160. With the post 18 of the present invention, when the post 18 is clamped by clamp 166 to the v-block fixture 158 with the pin 19 seated in the vertical groove 154, the prismatic projections 32 will extend either vertically or horizontally with the end 18a of the post 18 at which they are formed disposed beyond the forward surface 162 of the fixture. Accordingly, the present v-block fixture 158 provides for precise positioning of round posts 18 when clamped thereon to assist in properly setting up machining operations on electrodes and on workpieces with precision formed electrodes.

Similarly, FIGS. 25a and 25b illustrate the use of an angle plate 168 which has portions 170 and 172 that extend at right angles to each other with a groove 174 formed at the juncture therebetween. More specifically, the portions 170 and 172 include respective interior faces 176 and 178 thereof onto which the post 18 can be clamped, and the groove 174 is formed at the juncture of forward sides 180 and 182. Thus, with the post resting on the faces 176 and 178, the pin 19 can be seated in the groove 174 with the post 18 then clamped to the angled plate 168 for providing precise positioning of the post 18 relative thereto.

FIGS. 31 and 32 are also directed to a v-block fixture 184 similar to previously described fixture 158 including v-shaped upper surface 186 formed by inclined surface portion 186a and 186b, and forward vertical surface 188 having vertical groove 190 formed therein. Unlike the round side surface 66 of post 18, post 192 of FIGS. 31 and 32 has a polygonal cross-sectional configuration that is designed to seat very tightly on the v-shaped upper surface 186 for being clamped thereon and without the need for an indexing pin to provide predetermined position of the post 192 relative to the fixture 184. In this regard, the side surface 66 of the post 192 has two side surface portions 194 and 196 that include opposite inclined flat surface sections 198 and 200 and opposite parallel flat surface sections 202 and 204 extending upwardly from the upper end of respective inclined sections 198 and 200 and interconnected by a upper flat top surface 206 of the post 192. The inclined flat sections 198 and 200 are interconnected by a centrally disposed small lower flat surface 208. Thus, the polygonal shaped post 192 referenced from a horizontal plan taken through longitudinal axis 210 thereof has a lower octagonal half and an upper square half. As shown, the flats 198, 200 and 208 have a matching configuration to that of the upper generally v-shaped surface 186 of the fixture 184. Accordingly, the post 192 is precisely placed in a predetermined position every time it is seated on the v-block fixture 184 and clamped in place. In addition, similar to the round post 18, with the post 192 in its predetermined position on the fixture 184, the projections 32 will be oriented so that extend in either vertically or horizontally.

One of the key advantages to the polygonal post 192 is that the sections 202 and 204 exposed and extending up from the v-block fixture surface 186 extend generally vertically and the top surface 206 will be square thereto and extend horizontally which allows these to be readily used as reference points for determining dimensions of the electrodes for machining thereof. Whereas with square stock posts their corresponding exposed sides would extend at a generally 45 degree angle to the vertical, the present polygonal post 192 with the configuration of the side surface 66 as described above will present vertical and horizontal surfaces that can be used as references for machining operations.

FIGS. 35 and 36 illustrate an alternative post 212 that is well adapted to be used with v-block fixtures similar to fixtures 158 and 184. In particular, the post 212 is machined down from round stock so as to provide inclined flat sides 214 spaced 120 degrees from each other about central axis 216 of the post 212. As best seen in FIG. 36, the upper flat 214a oriented above the axis 216 in this figure is somewhat shorter in length than the lower flats 214b so that there is only a small rounded portion 218 between the flats 214b. This allows the flats 214b to be seated on the v-shaped upper surface of either one of the v-block fixtures 158 and 184 with the small rounded portion 218 resting on the bottom of the generally v-shaped upper surface at the juncture of the inclined sides thereof. An alternative construction for the post 212 is shown in FIGS. 37–39 where the flats 214 do not extend the full length of the post 212 and instead stop short of the forward end 212a thereof at which the raised projections 32 are formed as these flats 214b are not necessary for seating on the v-surface at the forward end 212a since this portion of the post 212 projects beyond the front face of these fixtures.

Referring next to FIGS. 26–30, there is shown an indicator spindle assembly 220 that is adapted to be used with the post of the present invention such as post 18 shown in FIGS. 26 and 30. The indicator spindle assembly 220 is designed to be used for truing of the tool/electrode or workpiece to machined, as is known. The assembly 220 includes a stationary annular member 222 having an enlarged upper flange portion 224 and a shaft 226 depending centrally therefrom, as best seen in FIG. 29. The shaft 226 has an outer diameter sized to be press fit into a roller bearing 228, and specifically the inner race 230 thereof with the outer race 222 freely rotatable thereabout.

An upper mounting surface 234 opposite the shaft 226 includes a portion 236 thereof that is configured to mate with the interfitting surface portion 26 of the post 18. Accordingly, the portion 236 is preferably a recessed portion with a prismatic shape so as to mate with the prismatic projections 32 on the posts herein. To clamp the interfitting surface portions 32 and 236 together, the stationary annular member 222 includes a counterbore 238 for seating of a fastener 38 therein and threaded into the aperture 36 of the post 18.

Indicator bracket 240 having a generally u-shaped body is clamped to the outer race 222 for rotation therewith and has a standard dial indicator 242 attached thereto. During a truing operation, the indicator 242 will provide readouts of adjustments necessary to provide for centering or truing of the tool or workpiece that is to be machined utilizing the posts of the present invention.

For proper formation of apertures 34 electrodes 12 in accordance with the present invention, a drill guide 244 having a central throughbore 245 can be provided as an accessory for guiding a drill bit 246 of a drill press into proper centered position in the body of the electrode 12 having its rear mounting surface 20 configured with the preferred prismatic recesses 30 herein. For this purpose, the drill guide 244 is provided with a lower surface 248 that is configured to mate with the interfitting portion 24 of the electrode 12, and in particular the prismatic recesses 30 thereof. Accordingly, the configured portion 250 of the drill guide surface 248 can be in the form of raised prismatic projections for mating in the prismatic recesses 30 of the electrode 12. For proper guiding of the bit 246 through central throughbore 245 of the drill guide 244, the walls 252 thereabout can be hardened. In this regard, the hardened walls 252 can be formed on a hardened bushing that is press fit into a central through opening formed in the drill guide 244.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A tool holding system for machining of tools or workpieces, the tool holding system comprising:
   a tool for removing metal material from a workpiece;
   a rear mounting surface of the tool having an aperture formed therein;
   a tool holder for mounting of the tool in predetermined positions thereon;
   an elongate post of the holder having a longitudinal axis and a first end at which the tool is mounted and a second end opposite the first end along the axis, the post including a longitudinally extending side surface parallel to the axis having one of: (1) a curved portion, and (2) at least two angled portions with their angles being at other than a right angle;
   a tool mounting surface of the post at the first end thereof and including an aperture therein;
   interfitting surface portions of the rear mounting surface of the tool and the tool mounting surface which cooperate to define the predetermined positions of the tool on the post relative to X-Y directions transverse to the post axis and a C-direction angularly thereabout with the apertures of the mounting surfaces being in alignment with each other; and
   a fastener for being received in the aligned apertures to clamp the interfitting surface portions together with the tool located in one of its predetermined positions on the post for fixing the tool against shifting relative to the post during machining operations.

2. The tool holding system of claim 1 wherein the tool comprises an electrode for removing metal from a workpiece by electric discharge machining, and at least one of the electrode and post includes a throughbore to provide a removable attachment between the electrode and post with the fastener seated in the throughbore, and the interfitting surface portions cooperating to provide accurate and repeatable attachment of different electrodes onto the post.

3. The tool holding system of claim 1 wherein the interfitting surface portions comprise mating raised and recessed portions extending in a generally cross-shaped pattern on the mounting surfaces with the apertures being generally centrally located thereon relative to the cross-shaped surface portions of the respective post and tool and aligned along the post longitudinal axis when the tool is fastened and clamped to the post in one of its predetermined positions thereon.

4. The tool holding system of claim 3 wherein the mating raised and recessed portions comprise prismatic shaped raised and recessed portions of the tool and post.

5. The tool holding system of claim 3 wherein the post includes the raised cross-shaped mating portion having sections extending radially from the aperture and at right angles to adjacent sections, and an indexing pin extending normal to the longitudinal axis and in alignment with one of the sections.

6. The tool holding system of claim 1 wherein the post side surface includes the at least two portions having their angles at other than a right angle with the two portions having opposite inclined flat sections and opposite parallel flat sections, the inclined flat and parallel section of each portion meeting and defining an obtuse angle therebetween, and a fixture having an upper surface with a predetermined generally v-shape for receiving the inclined flat sections of the post side surface portions flush thereon with the parallel flat sections extending in a generally vertical direction.

7. The tool holding system of claim 1 wherein the post side surface includes the curved portion which has a round shape, and an indexing pin extending therefrom normal to the post axis, and a fixture having an upper surface with a predetermined generally v-shape, and a vertical surface having a vertical recessed groove extending downward centrally from the v-shaped upper surface with the groove receiving the indexing pin therein for accurate, repeatable positioning of the round post when clamped in the v-fixture.

8. The tool holding system of claim 1 wherein the aperture of the tool includes an enlarged countersunk portion to allow for front mounting of the tool to the post with the fastener seated in the aperture enlarged portion of the tool.

9. The tool holding system of claim 1 wherein the tool includes a right angle adapter having mounting surfaces extending at right angles to each other and including apertures therein, and surface portions of the adapter mounting surfaces configured to mate with the interfitting surface portions with the apertures of the rear mounting surface and the tool mounting surface aligned with respective apertures of the adapter mounting surfaces for receiving fasteners therein to clamp the surface portions together with the tool facing at a right angle to the axis of the post.

10. The tool holding system of claim 1 wherein the tool includes an adapter having a post mounting surface including a portion configured to mate with the interfitting surface portion of the post tool mounting surface, and the tool comprises an electrode for removing metal from a workpiece by electric discharge machining, the electrode having a rear flat face and the adapter having an electrode mounting surface that is flat for being adhered to the electrode flat face.

11. The tool holding system of claim 1 wherein the post side surface includes the curved portion which has a round shape, and a fixture block having a round bore therein for receiving the round post and a clamping mechanism for fixing the post in the bore for machining of the tool or workpiece.

12. The tool holding system of claim 11 wherein the fixture block has a mounting surface to which the bore opens with the mounting surface including recessed grooves extending radially from the bore spaced at predetermined positions thereabout, the post includes an indexing pin extending normal to the axis for seating in one of the grooves, and the clamping mechanism includes clamp members and associated cam operators for drawing of the clamp members down toward the mounting surface from a raised position to clamp the pin in the groove.

13. The tool holding system of claim 1 wherein the tool comprises an electrode for removing metal from a workpiece by electric discharge machining, and the post includes an enlarged flange portion at the first end thereof with the tool mounting surface of the post being an electrode mounting surface on the flange portion for mounting of large electrodes.

14. The tool holding system of claim 1 including an indicator spindle assembly for truing of the tool or workpiece to be machined, and a stationary member of the assembly having an enlarged flange and a shaft depending centrally therefrom, and including an upper mounting surface opposite the shaft having a portion configured to mate with the interfitting surface portion of the post for mounting of the post in predetermined positions relative to the stationary member;

a roller bearing having an inner race which receives the stationary member shaft press fit therein, and an outer race rotatable relative to the inner race; and an indicator bracket clamped to the outer race, and a dial indicator attached to the bracket for providing a readout of adjustments necessary to provide for truing of the tool or workpiece to be machined.

15. The tool holding system of claim 1 including a drill guide for forming the aperture in the rear mounting surface of the tool, the drill guide having a surface including a portion configured to mate with the interfitting surface portion of the tool for mounting of the tool in predetermined positions relative to the drill guide to obtain accurate locating of the aperture drilled in the tool, and a throughbore of the guide including a hardened wall thereabout for guiding a drilling tool therethrough to form the aperture in the tool with the drill guide surface portion mated in the tool interfitting surface portion.

16. A fixture for mounting of a round electrode post holder having a transverse indexing pin in predetermined positions relative thereto, the fixture comprising:

a fixture body including a surface having a bore therein of a round cross-sectional shape for receiving the round post therein;

grooves recessed in the fixture surface and extending generally radially from the bore for receiving the indexing pin therein with the post in the bore;

clamp members spaced from the grooves for being shifted toward the grooves to clamp the pin in one of the grooves; and cam clamp operators mounted to the fixture operable to shift the clamp members toward the grooves for clamping of the pin in the groove to locate the post angularly relative to the fixture for accurate machining of the electrode to form the precise predetermined shape thereof and of workpieces with the precisely formed electrode mounted to the post.

17. The fixture of claim 16 wherein the fixture body comprises a fixture block, the clamp members each include a stem having a transverse throughbore formed therein with the throughbore including one of an inclined and a horizontal cam surface, and the cam clamp operators each include a fastener threadably mounted to the block with each of the fasteners being operable to be advanced into the throughbore of the stem adjacent thereto and against the cam surface thereof for drawing the associated clamp member toward the groove to clamp the pin therein.

18. The fixture of claim 17 wherein the fasteners each include an eccentric portion which engages against the cam surface as the fastener is advanced in the throughbore to draw the clamp member toward the groove.

19. An electric discharge machining system comprising:

an electrode having a predetermined precisely formed shape;

an electrode mounting post having a generally round cross-sectional configuration and a longitudinal axis extending therethrough;

mounting surfaces of the electrode and post including mating portions thereof which define a plurality of predetermined positions for mounting of the electrode to the post;

apertures formed in the mounting surfaces of the electrode and post which are aligned with each other with the electrode located in one of its predetermined positions on the post for receiving a fastener to clamp the mating portions together fixing the electrode in the one predetermined position on the post;

an indexing pin of the post extending normal to the longitudinal axis thereof;

a fixture for the post and including a surface having a bore therein of a round cross-sectional shape for receiving the round post therein;

grooves recessed in the fixture surface and extending generally radially from the bore for receiving the indexing pin therein with the post in the bore;

clamp members spaced from the grooves for being shifted toward the grooves to clamp the pin in one of the grooves; and cam clamp operators mounted to the fixture operable to shift the clamp members toward the grooves for clamping of the pin in the groove to locate the post angularly relative to the fixture for accurate machining of the electrode to form the precise predetermined shape thereof and of workpieces with the precisely formed electrode mounted to the post.

20. The electric discharge machining system of claim 19 wherein the mating portions comprise a raised cross-shaped portion on the mounting surface of one of the electrode and post and a complementary recessed cross-shaped portion on the other of the electrode and post to define four predetermined positions of the electrode relative to the post so that with the raised portion tightly received in the complementary recessed portion, the electrode is precisely located in X and Y directions transverse to the post axis and in a C direction angularly about the axis in one of the four predetermined positions.

21. The electric discharge machining system of claim 20 wherein the apertures are disposed centrally relative to the cross-shaped portions to define four sections of each portion that extend radially from the aperture and which are at right angles to adjacent sections, and the complementary raised and recessed portions have a prismatic predetermined matching shape to provide a tight mating interfit therebetween.

22. The electric discharge machining system of claim 19 wherein the fixture comprises a fixture block, the clamp members each include a stem having a transverse throughbore formed therein with the throughbore including an inclined cam surface, and the cam clamp operators each include a fastener threadably mounted to a side of the block with each of the fasteners being operable to be advanced into the throughbore of the stem adjacent thereto and against the cam surface thereof for drawing the associated clamp member toward the groove to clamp the pin therein.

23. The electric discharge machining system of claim 22 wherein the fasteners each include an eccentric portion which engages against the cam surface as the fastener is advanced in the throughbore to draw the clamp member toward the groove.

24. A combination of a fixture and a tool holder for carrying a tool with the fixture mounting the tool holder in predetermined positions relative thereto, the combination comprising:

an elongate post of the tool holder having a round cross-sectional configuration with a longitudinal axis extending between opposite ends of the post;

an indexing member attached to the post extending transverse to the post axis;

one of the ends of the post operably connected to the tool for cutting metal material from a workpiece;

a fixture body having a bore therein of round cross-sectional shape for rotatably receiving a portion of the round post therein with the round post portion including the other end of the post opposite the one end with the one end of the post exterior of the bore;

recesses in the fixture body extending generally radially from the bore, the recesses being at predetermined positions about the bore so that with the indexing member received in one of the recesses the position of the post will be predetermined relative to the fixture body;

a side of the fixture body having an opening therein extending generally transverse to the fixture body bore;

an actuator for being connected to the opening operable for fixing the indexing member in one of the recesses; and threads in the opening in the side of the fixture body and threads of the actuator configured to allow rotation of the actuator to advance the actuator in the fixture body side opening to fix the indexing member in one of the recesses.

25. The combination of claim 24 wherein the fixture body has a cube shape with the recesses and bore formed in one of the surfaces of the cube-shaped body.

26. The combination of claim 24 wherein the recesses comprise four recesses with their predetermined positions being spaced ninety degrees about the bore to allow the post to be rotatably indexed in the bore at ninety degree increments.

27. The combination of claim 24 wherein the indexing member is a single indexing pin extending normal to the post axis.

28. The combination of claim 24 including a clamping device for holding the post portion in the bore with the indexing member received in one of the recesses.

29. The combination of claim 28 wherein the clamping device includes clamp members spaced from the recesses for being shifted toward the recesses to clamp the indexing member in one of the recesses.

30. The combination of claim 24 wherein the actuator comprises a threaded fastener, and a mechanical locking mechanism between the threaded fastener and the post and operable by advancing movement of the fastener to lock the post to the fixture body against relative movement therebetween so that the threaded fastener does not engage the post for locking of the post to the body.

31. The combination of claim 30 wherein the mechanical locking mechanism includes members configured to apply a longitudinal force to the indexing member to draw the indexing member into tight engagement in the fixture body recess.

32. The combination of claim 30 wherein the mechanical locking mechanism has locked and released positions, and a biasing mechanism including a spring that biases the locking mechanism to the release position thereof to allow shifting of the post relative to the fixture body.

* * * * *